US008880886B2

(12) United States Patent
Kean et al.

(10) Patent No.: US 8,880,886 B2
(45) Date of Patent: Nov. 4, 2014

(54) SYSTEMS AND METHODS FOR AUTHENTICATING MOBILE DEVICES

(75) Inventors: Brian Kean, Missouri Valley, IA (US); Devin Michael Cambridge, Atlanta, GA (US); Stephen M. Meyers, Omaha, NE (US); Roger Lynn Musfeldt, Omaha, NE (US); Brent Dewayne Adkisson, Omaha, NE (US); Norman Theodore Davis, Jr., Elkhorn, NE (US)

(73) Assignee: First Data Corporation, Greenwood Village, CO (US)

( * ) Notice: Subject to any disclaimer, the term of this patent is extended or adjusted under 35 U.S.C. 154(b) by 53 days.

(21) Appl. No.: 13/481,433

(22) Filed: May 25, 2012

(65) Prior Publication Data

US 2012/0303961 A1     Nov. 29, 2012

Related U.S. Application Data

(60) Provisional application No. 61/490,501, filed on May 26, 2011.

(51) Int. Cl.

| H04L 29/06 | (2006.01) |
|---|---|
| H04L 9/32 | (2006.01) |
| H04W 12/02 | (2009.01) |
| H04W 4/00 | (2009.01) |

(52) U.S. Cl.
CPC ............ *H04L 9/3234* (2013.01); *H04L 63/126* (2013.01); *H04L 2463/061* (2013.01); *H04W 4/001* (2013.01); *H04L 2463/062* (2013.01); *H04L 2209/80* (2013.01); *H04W 12/02* (2013.01); *H04L 63/061* (2013.01)
USPC ............................ 713/171; 713/155; 713/310

(58) Field of Classification Search
CPC ............ H04L 2001/00; H04L 2203/00; H04L 63/061; H04L 9/3234; H04L 2463/062; H04L 2209/80; H04L 63/126; H04L 2463/061; H04W 12/02; H04W 4/001
USPC .......................................... 713/150–181, 310
See application file for complete search history.

(56) References Cited

U.S. PATENT DOCUMENTS

| 6,044,350 | A | 3/2000 | Weiant, Jr. et al. |
|---|---|---|---|
| 6,163,771 | A | 12/2000 | Walker et al. |
| 6,422,462 | B1 | 7/2002 | Cohen |
| 7,213,147 | B2 | 5/2007 | Tuvell et |
| 7,353,388 | B1 | 4/2008 | Gilman et al. |
| 7,548,621 | B1 | 6/2009 | Smith et al. |

(Continued)

OTHER PUBLICATIONS

Non-final Office Action for U.S. Appl. No. 13/481,394 mailed May 21, 2014.

(Continued)

*Primary Examiner* — Chau Le
*Assistant Examiner* — Don Zhao
(74) *Attorney, Agent, or Firm* — Sutherland Asbill & Brennan LLP

(57) ABSTRACT

Embodiments of the invention provide systems and methods for authenticating mobile devices. A registration request and identifying information for a mobile device or a secure element associated with the mobile device may be received. Based upon the received identifying information and a base level key, a rotated key for the mobile device may be determined. The determined rotated key may then be provided to the mobile device, and the rotated key may be utilized for subsequent authentication of the mobile device.

18 Claims, 7 Drawing Sheets

(56) References Cited

U.S. PATENT DOCUMENTS

| | | | |
|---|---|---|---|
| 8,078,867 | B2 | 12/2011 | Brown et al. |
| 8,489,740 | B2 | 7/2013 | Schneider |
| 8,560,849 | B2 | 10/2013 | Machani et al. |
| 8,627,092 | B2 | 1/2014 | Fischer et al. |
| 8,689,012 | B1 * | 4/2014 | Bierbaum et al. ............ 713/193 |
| 8,752,127 | B2 | 6/2014 | Musfeldt et al. |
| 8,775,305 | B2 | 7/2014 | Pointer |
| 2004/0123102 | A1 | 6/2004 | Gehrmann et al. |
| 2005/0182855 | A1 | 8/2005 | Apostolopoulos et al. |
| 2005/0198506 | A1 * | 9/2005 | Qi et al. ....................... 713/170 |
| 2005/0250538 | A1 | 11/2005 | Narasimhan et al. |
| 2006/0064458 | A1 | 3/2006 | Gehrmann |
| 2006/0077034 | A1 | 4/2006 | Hillier |
| 2006/0179305 | A1 | 8/2006 | Zhang |
| 2007/0091843 | A1 * | 4/2007 | Patel et al. .................... 370/331 |
| 2008/0049940 | A1 | 2/2008 | Kocher |
| 2008/0130902 | A1 * | 6/2008 | Foo Kune et al. ............ 380/286 |
| 2008/0141031 | A1 | 6/2008 | Oba et al. |
| 2008/0257952 | A1 | 10/2008 | Zandonadi |
| 2008/0305772 | A1 * | 12/2008 | Balasubramanian et al. 455/411 |
| 2009/0074189 | A1 | 3/2009 | Ryu et al. |
| 2009/0134217 | A1 | 5/2009 | Flitcroft et al. |
| 2009/0164774 | A1 | 6/2009 | Sherkin |
| 2009/0235065 | A1 | 9/2009 | Nilsson et al. |
| 2009/0307482 | A1 | 12/2009 | McCann |
| 2010/0005307 | A1 | 1/2010 | Prashanth |
| 2010/0106967 | A1 * | 4/2010 | Johansson et al. ............ 713/158 |
| 2010/0191966 | A1 | 7/2010 | Immonen |
| 2010/0241847 | A1 | 9/2010 | van der Horst et al. |
| 2010/0257360 | A1 | 10/2010 | Bae et al. |
| 2011/0010538 | A1 | 1/2011 | Falk et al. |
| 2011/0154021 | A1 | 6/2011 | McCann et al. |
| 2011/0208965 | A1 | 8/2011 | Machani |
| 2011/0231319 | A1 | 9/2011 | Bayod et al. |
| 2011/0314274 | A1 | 12/2011 | Swartz |
| 2012/0017089 | A1 | 1/2012 | Kocher |
| 2012/0159105 | A1 | 6/2012 | von Behren et al. |
| 2012/0172089 | A1 | 7/2012 | Bae et al. |
| 2012/0174189 | A1 * | 7/2012 | Lim et al. ......................... 726/3 |
| 2013/0179695 | A1 | 7/2013 | Zollinger et al. |

OTHER PUBLICATIONS

Non-final Office Action for U.S. Appl. No. 13/481,364 mailed Jun. 4 2014.

Final Office Action for U.S. Appl. No. 13/481,387 mailed Jun. 25, 2014.

Non-final Office Action for U.S. Appl. No. 13/481,356 mailed Jun. 27 2014.

\* cited by examiner

SYSTEMS AND METHODS FOR AUTHENTICATING MOBILE DEVICES

RELATED APPLICATION

This application claims priority to U.S. Ser. No. 61/490,501, titled "Trusted Service Manager," filed on May 26, 2011, the contents of which are incorporated herein by reference.

FIELD OF THE INVENTION

Embodiments of the invention relate generally to mobile devices, and more specifically to systems and methods for authenticating mobile devices.

BACKGROUND OF THE INVENTION

Mobile devices, such as cell phones, personal digital assistants ("PDAs"), smart phones, and other similar devices, have increasingly been utilized to provide additional functionality beyond traditional voice communications. One component of enabling the mobile devices to support these additional functionalities includes installing software applications on the mobile devices. Mobile device applications can facilitate a variety of services performed by or with the mobile devices, including payment applications (e.g., prepaid, credit, debit, etc.), loyalty or incentive applications, transportation payment applications, access control applications, entertainment applications, and the like. Given the sensitive nature of data that may be transmitted or communicated during the provision of a service, such as a payment service, authentication of mobile devices and/or the protection of data becomes critical. Accordingly, improved systems and methods for authenticating mobile devices are desirable.

Additionally, service providers operating services associated with these applications, and thus providing the mobile device software applications, need to be able to interact with their customers regardless of the carrier network the customer uses for operating the mobile device. Accordingly, multiple service providers (e.g., card issuing banks, retailers, transit operators, etc.) need to load and manage applications (e.g., near field communication-based ("NFC-based") applications, etc.) onto mobile devices supported by multiple mobile network operators. Sharing confidential information through large numbers of individual relationships (i.e., between one service provider and one mobile network operator) is inefficient, requiring complex integration by the service providers for each mobile network operator supported, and by the mobile network operators for each service provider installing applications. Accordingly, there exists a need for providing trusted service management functionality and integration between multiple service providers and multiple mobile network operators. Additionally, there exists a need for a trusted service management system to authenticate mobile devices.

BRIEF DESCRIPTION OF THE INVENTION

Embodiments of the invention may provide systems and methods for authenticating mobile devices. According to one example embodiment of the invention, a method for authenticating mobile devices is provided. A registration request and identifying information for a mobile device or a secure element associated with the mobile device may be received. Based upon the received identifying information and a base level key, a rotated key for the mobile device may be determined. The determined rotated key may then be provided to the mobile device, and the rotated key may be utilized for subsequent authentication of the mobile device. In certain embodiments, the above operations may be performed by one or more computers associated with a provisioning service provider.

According to another embodiment, a system for authenticating mobile devices may be provided. The system may include at least one memory and at least one processor. The at least one memory may be configured to store computer-executable instructions. The at least one processor may be configured to access the at least one memory and execute the computer-executable instructions to: receive, from a mobile device, a registration request and identifying information for the mobile device or a secure element associated with the mobile device; determine, based upon the received identifying information and a base level key, a rotated key for the device; and provide the determined rotated key to the mobile device, wherein the rotated key is utilized for subsequent authentication of the mobile device.

Additional systems, methods, apparatus, features, and aspects are realized through the techniques of various embodiments of the invention. Other embodiments and aspects of the invention are described in detail herein and are considered a part of the claimed invention. Other advantages and features can be understood with reference to the description and to the drawings.

DETAILED DESCRIPTION

Figure 1:
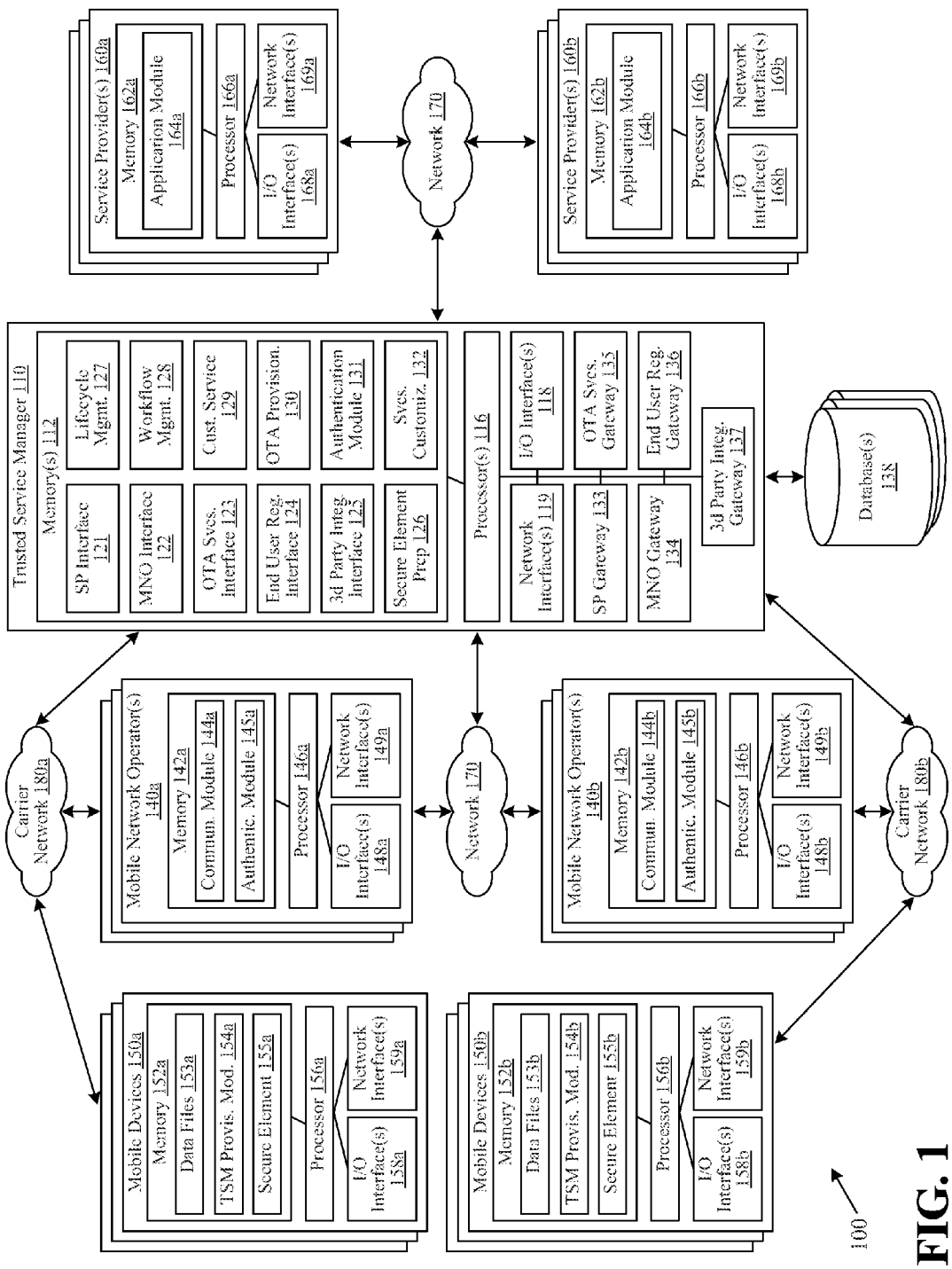
FIG. 1 illustrates a block diagram of an example trusted service management system and associated integration, according to an example embodiment of the invention.

Various embodiments of the invention are directed to authenticating mobile devices and/or communications between one or more service providers and mobile devices. In certain embodiments, a mobile device may be registered with a service provider, such as a trusted service management system. To facilitate the registration, a registration request may be received by the service provider from the mobile device. Additionally, in association with the registration request, identifying information for the mobile device and/or a secure element associated with the mobile device may be received. A wide variety of identifying information may be received as desired in various embodiments of the invention, such as card production life cycle ("CPLC") information associated with the mobile device secure element. The secure element may include any suitable hardware and/or software and, as desired, may be separate from other components of the mobile device. For example, the secure element may be a separate chip situated within a mobile device and configured to communicate with other components of the mobile device, such as another chip and/or various communication interfaces.

Once a registration request and identifying information have been received, the service provider may determine or generate a rotated key for the mobile device. As desired, a secure communications channel may be established with the mobile device secure element, and the secure element may be authenticated prior to determining the rotated key. In certain embodiments, at least a portion of the identifying information and a base level key, such as a master key, may be utilized to generate the rotated key. In other words, a device specific rotated key may be generated or derived for the mobile device. Once generated, the rotated key may be provided to the mobile device for storage by the secure element. Additionally, the rotated key and/or the identifying information may be stored by the service provider. The rotated key may then be utilized for subsequent authentication of the mobile device, such as an authentication of the device by the service provider during the processing of a provisioning request (e.g., a request to provision an application and/or a financial account onto the mobile device, etc.). For example, the service provider may receive a provisioning request that has been encrypted by the mobile device utilizing the rotated key. The service provider may access a stored rotated key for the mobile device or utilize the stored identifying information to generate a rotated key that may be utilized to decrypt the provisioning request and authenticate the mobile device.

Additionally, in certain embodiments, the service provider may update at least a portion of the identifying information in conjunction with providing the rotated key to the mobile device. For example, the service provider may update or modify a CPLC for the secure element. The updated identifying information may then be provided to the mobile device and, as desired, stored by the service provider. Accordingly, during the processing of a subsequent request received from the mobile device, the updated identifying information may be utilized in the authentication of the mobile device and/or to authenticate the received request. For example, the updated identifying information may be received in conjunction with a request and compared to stored identifying information. In other embodiments, the updated identifying information may be utilized in the derivation of the rotated key.

As desired in certain embodiments, the authentication performed with the rotated key may be utilized as a base level authentication of the mobile device. For example, a rotated key may be utilized to generate a request to provision an authentication application to the mobile device. Following a validation of the mobile device and any identifying information for the mobile device, an authentication application, such as an authentication application configured to generate transaction specific keys (e.g., derived unique keys per transaction ("DUKPT")), may be provisioned to the mobile device. Additionally or alternatively, the rotated key may be utilized to verify stored identifying information, such as stored CPLC data, that will be utilized to generate transaction specific keys.

Various embodiments of the invention utilize trusted service management functionality to facilitate integration between multiple service providers and multiple mobile devices operating on any number of carrier networks, each operated by a different mobile network operator ("MNO"). In certain embodiments, a trusted service manager ("TSM") may be a third party entity strategically positioned to provide mobile device application provisioning services and integration functionality for provisioning mobile device applications and associated end user data to end users' mobile devices, to provide mobile device application-related lifecycle management services, to manage the many-to-many relationships between the multiple service providers and the MNOs operating the carrier networks, and/or to authenticate mobile devices during the processing of a wide variety of different requests and/or transactions.

Applications that can be provisioned on mobile devices via a TSM can be any software application provided by a service provider and operable with a mobile device. According to one embodiment, near field communication ("NFC") applications that enable subsequent transactions using NFC technology of the mobile device (e.g., radio frequency identification ("RFID")) are among those mobile device applications provided by service providers. However, as used herein, mobile device applications are not limited to NFC-based applications. Example mobile device applications may include, but are not limited to, open loop and closed loop payment applications (e.g., MasterCard® PayPass™, Visa payWave™, American Express® ExpressPay, Discover® ZIP, NXP Mifare®, etc.), transit payment applications, loyalty applications, membership applications, electronic promotion and incentive applications, ticketing applications, access control and security applications, entertainment applications, retail shopping applications, and the like.

In addition to providing integration and mobile device application provisioning functionality, a TSM may be further operable to provide additional features and functionality associated with each application provisioned and with each service provider, MNO, and/or mobile device end user relationship. Example additional features that a TSM may provide include, but are not limited to, application lifecycle management (e.g., load, personalize, lock, unlock, terminate, etc.), secure element lifecycle management (e.g., lock, unlock, terminate, etc.), workflow management (e.g., new handset, exchanged handset, damaged handset, lost handset, stolen handset, closed MNO account, closed service provider account, etc.), secure element data preparation and application personalization, MNO customer service, service provider customer service, over the air ("OTA") provisioning, secured key management, end user authentication, MNO-based end user registration, carrier network-based end user registration, service provider-based end user registration, interactive voice response-based ("IVR-based") end user registration, live end user registration, and the like. It is appreciated that the aforementioned additional TSM features and functionality are provided for illustrative purposes only, and that any number of features and functionality may be provided by the TSM to service providers, MNOs, and/or end users in association with the application provisioning services and functionality.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 represents a block diagram of an example system 100 for providing trusted service management functionality, according to one embodiment of the invention. As shown in FIG. 1, a trusted service manager ("TSM") computer 110; multiple mobile network operator ("MNO") computers 140a, 140b; multiple mobile devices 150a, 150b; and multiple service provider computers 160a, 160b may be in communication via at least one network 170 and/or multiple carrier networks 180a, 180b, each of the carrier networks 180a, 180b being associated with a respective MNO computer 140a, 140b. Each of these components will now be discussed in further detail.

First, the TSM computer 110 may include any number of processor-driven devices, including but not limited to, a server computer, a mainframe computer, one or more networked computers, a desktop computer, a personal computer, a laptop computer, a mobile computer, or any other processor-based device. In addition to having one or more processors 116, the TSM computer 110 may further include one or more memory devices 112, input/output ("I/O") interface(s) 118, and network interface(s) 119. The memory 112 may be any computer-readable medium, coupled to the processor(s) 116, such as RAM, ROM, and/or a removable storage device for storing data files and a database management system ("DBMS") to facilitate management of data files and other data stored in the memory 112 and/or stored in one or more separate databases 138. The memory 112 may also store various program modules, such as an operating system ("OS"), a service provider interface 121, a mobile network operator interface 122, an over the air provisioning provider interface 123, an end user registration interface 124, a third party integrator interface 125, a secure element preparation module 126, a lifecycle management module 127, a workflow management module 128, a customer service module 129, an over the air provisioning module 130, an authentication module 131, and a services customization module 132. The OS may be, but is not limited to, Microsoft Windows®, Apple OSX™, Unix, a mainframe computer operating system (e.g., IBM z/OS, MVS, OS/390, etc.), or a specially designed operating system. Each of the interfaces and modules 121, 122, 123, 124, 125, 126, 127, 128, 129, 130, 131, 132 may comprise computer-executable program instructions or software, including a dedicated program, for receiving, storing, extracting, managing, processing, and analyzing transactions associated with application provisioning, lifecycle management, and/or authentication between multiple service provider computers 160a, 160b and multiple mobile devices 150a, 150b operating on multiple carrier networks 180a, 180b, each of which are operated by a different MNO computer 140a, 140b. The specific functions and operability of each of these interfaces and modules 121, 122, 123, 124, 125, 126, 127, 128, 129, 130, 131, 132 are described in greater detail below.

Still referring to the TSM computer 110, the I/O interface(s) 118 may facilitate communication between the processor 116 and various I/O devices, such as a keyboard, mouse, printer, microphone, speaker, monitor, bar code reader/scanner, RFID reader, or Hardware Security Modules ("HSMs") which facilitate secure key management and the like. With respect to HSMs, an HSM may be external, such as connected to the TSM computer 110 via a network, or internally or proximately connected to the TSM computer 110. The network interface(s) 119 may take any of a number of forms, such as, but not limited to, a network interface card, a modem, a wireless network card, a cellular network card, or any other means operable for facilitating communications with one or more carrier networks 180a, 180b and/or other networks 170. Indeed, the TSM computer 110 can communicate directly with mobile devices 150a, 150b via the carrier networks 180a, 180b, respectively, via network interface(s) 119 and/or via one or more of a service provider gateway 133, mobile network operator gateway 134, over the air services gateway 135, end user registration gateway 136, and third party integrator gateway 137. It will be appreciated that the TSM computer 110 may be implemented on a particular machine, which may include a computer that is designed, customized, configured, or programmed to perform at least one or more functions of the interfaces and modules 121, 122, 123, 124, 125, 126, 127, 128, 129, 130, 131, 132, according to an example embodiment of the invention.

Second, the MNO computers 140a, 140b may include any number of processor-driven devices, including but not limited to, a server computer, a mainframe computer, one or more networked computers, a desktop computer, a personal computer, a laptop computer, a mobile computer, or any other processor-based device. In addition to having one or more processors 146a, 146b, each of the MNO computers 140a, 140b may further include one or more memory devices 142a, 142b, input/output ("I/O") interface(s) 148a, 148b, and network interface(s) 149a, 149b. The memory 142a, 142b may be any computer-readable medium, coupled to the processor(s) 146, such as RAM, ROM, and/or a removable storage device for storing data files and a DBMS to facilitate management of data files and other data stored in the memory 142a, 142b and/or stored in one or more separate databases. The memory 142a, 142b may also store various program modules, such as an operating system ("OS"), a communications module 144a, 144b, and an authentication module 145a, 145b. The OS may be, but is not limited to, Microsoft Windows®, Apple OSX™, Unix, a mainframe computer operating system (e.g., IBM z/OS, MVS, OS/390, etc.), or a specially designed operating system. The communications module 144a, 144b may comprise computer-executable program instructions or software, including a dedicated program, for facilitating communications with multiple mobile devices 150a, 150b operating on the respective carrier networks 180a, 180b, and for facilitating mobile device application provisioning and management via a common MNO messaging standard as implemented by the TSM computer 110. The authentication module 145a, 145b may comprise computer-executable program instructions or software, including a dedicated program, for facilitating the authentication of mobile devices 150a, 150b and/or the establishment of secure communications channels with mobile devices 150a, 150b. A wide variety of authentication procedures may be utilized as desired by an authentication module 145a, 145b. In certain embodiments of the invention, an MNO computer 140a, 140b may authenticate a mobile device 150a, 150b in a similar manner as the TSM 110.

Still referring to each MNO computer 140a, 140b, the I/O interface(s) 148a, 148b may facilitate communication between the processors 146a, 146b and various I/O devices, such as a keyboard, mouse, printer, microphone, speaker, monitor, bar code reader/scanner, RFID reader, and the like. The network interface(s) 149a, 149b may take any of a number of forms, such as, but not limited to, a network interface card, a modem, a wireless network card, a cellular network card, or any other means operable for facilitating communications with one or more carrier networks 180a, 180b and/or other network 170. It will be appreciated that the MNO computers 140a, 140b may be implemented on a particular machine, which may include a computer that is designed, customized, configured, or programmed to perform at least one or more functions of the communications module 144a, 144b, according to an example embodiment of the invention.

Third, the mobile devices 150a, 150b may be any mobile processor-driven device, such as a mobile phone, radio, pager, laptop computer, handheld computer, PDA, and the like, or any other processor-based mobile device for facilitating communications over one or more carrier networks 180a, 180b. For example, each mobile device 150a, 150b may be registered with a specific MNO computer 140a, 140b for communicating via the respective carrier network 180a, 180*b*. In addition to having one or more processors 156*a*, 156*b*, each of the mobile devices 150*a*, 150*b* may further include one or more memory devices 152*a*, 152*b*, input/output ("I/O") interface(s) 158*a*, 158*b*, and network interface(s) 159*a*, 159*b*. The memory 152*a*, 152*b* may be any computer-readable medium, coupled to the processor(s) 156, such as RAM, ROM, and/or a removable storage device for storing data files. The memory 152*a*, 152*b* may also include secure elements 155*a*, 155*b* for maintaining mobile device applications and confidential data offered by one or more service providers 160, as may be provisioned via the TSM computer 110 and associated provisioning services. In certain embodiments, a secure element 155*a*, 155*b* may be configured to store a rotated key and/or other key information, as well as certain identification information for the mobile device and the secure element 155*a*, 155*b* (e.g., CPLC information, etc.). As desired, the secure element 155*a*, 155*b* may utilize at least a portion of this information to generate requests, such as provisioning requests, that are communicated to the TSM computer 110. In this regard, a mobile device 150*a*, 150*b* and/or an associated secure element 155*a*, 155*b* may be authenticated. Additionally, in certain embodiments, a secure element 155*a*, 155*b* may store an authentication module or program utilized by a mobile device 150*a*, 150*b* to generate transaction specific keys, encrypt communications output by the mobile device 150*a*, 150*b*, and/or decrypt communications received by the mobile device 150*a*, 150*b*.

The memory 152*a*, 152*b* may also store any number of data files 153*a*, 153*b* and/or various program modules, such as an operating system ("OS"), end user interface module(s), and a TSM provisioning module 154*a*, 154*b* (also referred to interchangeably herein as "TSM administration software"). The OS may be any mobile operating system, including proprietary operating systems by a mobile device manufacturer or mobile network operator, or third party software vendor mobile operating system, such as, but not limited to, Microsoft Windows CE®, Microsoft Windows Mobile®, Symbian OS™, Apple iPhone™ OS, RIM BlackBerry® OS, Palm OS® by ACCESS, or Google Android™. The TSM provisioning module 154*a*, 154*b* may comprise computer-executable program instructions or software, including a dedicated program, for facilitating mobile device application provisioning on general memory and/or on the secure elements 155*a*, 155*b* as carried out by the TSM computer 110. According to various embodiments, the secure elements 155*a*, 155*b* may refer to any computer-readable storage in the memory 152 and/or may refer to any securitized medium having memory, such as a Universal Integrated Circuit Card ("UICC"), Subscriber Identity Module ("SIM"), and the like. In one example, the secure elements 155*a*, 155*b* may be operable with a RFID device or other NFC device associated with the mobile devices 150*a*, 150*b*. It is also appreciated that the secure elements 155*a*, 155*b* may be a separate embedded secure element (e.g., smart card chip) or a separate element (e.g., removable memory card, a key fob; connected via Bluetooth, etc.). For example, a secure element chip may be embedded in a mobile device 150*a*, 150*b* separately from a general operation chip utilized by the mobile device 150*a*, 150*b*. In certain embodiments, the secure elements 155*a*, 155*b* may include any suitable hardware and/or software, such as memory, processing components, and communications components. In certain embodiments, the secure elements 155*a*, 155*b* may be configured to communicate with other elements of the mobile devices 150*a*, 150*b*, such as a general or shared memory chip associated with the mobile devices 150*a*, 150*b*. For example, a mobile wallet may be stored in shared memory, and a secure element 155*a*, 155*b* may be accessed to encrypt and/or decrypt transactions generated by and/or received by the mobile wallet.

Still referring to each mobile device 150*a*, 150*b*, the I/O interface(s) 158*a*, 158*b* may facilitate communication between the processors 156*a*, 156*b* and various I/O devices, such as a keypad, touch screen, keyboard, mouse, printer, microphone, speaker, screen display, RFID device, NFC device, and the like. The network interface(s) 159*a*, 159*b* may take any of a number of forms to permit wireless communications according to various communications standards, such as, but not limited to, Code Division Multiple Access ("CDMA"), Global System for Mobile Communication ("GSM"), Universal Wireless Communications ("UWC"), Universal Mobile Telecommunications System ("UMTS"), or General Packet Radio Service ("GPRS") communication standards as may be implemented by one or more carrier networks 180*a*, 180*b*. The network interfaces(s) 159*a*, 159*b* may further permit access to other networks 170, such as via one or more carrier networks 180*a*, 180*b* providing Internet or other network access, or via Wi-Fi communications onto a Wi-Fi network. It will be appreciated that the mobile devices 150*a*, 150*b* may be implemented on a particular machine, which may include a computer that is designed, customized, configured, or programmed to perform at least one or more functions of the TSM provisioning module 154*a*, 154*b* and other mobile communications, including voice communications, data communications, short message service ("SMS"), wireless application protocol ("WAP"), multimedia message service ("MMS"), Internet communications, other wireless communications, and the like, according to an example embodiment of the invention.

Fourth, the service provider ("SP") computers 160*a*, 160*b* may include any number of processor-driven devices, including but not limited to, a server computer, a mainframe computer, one or more networked computers, a desktop computer, a personal computer, a laptop computer, a mobile computer, or any other processor-based device. In addition to having one or more processors 166*a*, 166*b*, each of the service provider computers 160*a*, 160*b* may further include one or more memory devices 162*a*, 162*b*, input/output ("I/O") interface(s) 168*a*, 168*b*, and network interface(s) 169*a*, 169*b*. The memory 162*a*, 162*b* may be any computer-readable medium, coupled to the processor(s) 166, such as RAM, ROM, and/or a removable storage device for storing data files and a DBMS to facilitate management of data files and other data stored in the memory 162*a*, 162*b* and/or stored in one or more separate databases. The memory 162*a*, 162*b* may also store various program modules, such as an operating system ("OS") and a mobile device application module 164*a*, 164*b*. The OS may be, but is not limited to, Microsoft Windows®, Apple OSX™, Unix, a mainframe computer operating system (e.g., IBM z/OS, MVS, OS/390, etc.), or a specially designed operating system. The mobile device application module 164*a*, 164*b* may comprise computer-executable program instructions or software, including a dedicated program, for generating and/or providing mobile device software applications for provisioning on multiple mobile devices 150*a*, 150*b* via a common service provider messaging standard as implemented by the TSM computer 110.

Still referring to each service provider computer 160*a*, 160*b*, the I/O interface(s) 168*a*, 168*b* may facilitate communication between the processors 166*a*, 166*b* and various I/O devices, such as a keyboard, mouse, printer, microphone, speaker, monitor, bar code reader/scanner, RFID reader, and the like. The network interface(s) 169*a*, 169*b* may take any of a number of forms, such as, but not limited to, a network interface card, a modem, a wireless network card, a cellular network card, or any other means operable for facilitating communications with the network 170. It will be appreciated that the service provider computer 160a, 160b may be implemented on a particular machine, which may include a computer that is designed, customized, configured, or programmed to perform at least one or more functions of the mobile device application module 164a, 164b, according to an example embodiment of the invention.

The network 170 may include any telecommunication and/or data network, whether public, private, or a combination thereof, including a local area network, a wide area network, an intranet, an internet, the Internet, intermediate handheld data transfer devices, a publicly switched telephone network ("PSTN"), a cellular network, and/or any combination thereof and may be wired and/or wireless. The network 170 may also allow for real time, near real time, off-line, and/or batch transactions to be transmitted between or among the TSM computer 110, the MNO computer(s) 140a, 140b, the mobile devices 150a, 150b, and the service provider computers 160a, 160b. Due to network connectivity, various methodologies as described herein may be practiced in the context of distributed computing environments. It will also be appreciated that the network 170 may include a plurality of networks, each with devices such as gateways and routers for providing connectivity between or among networks 170. Instead of, or in addition to, a network 170, dedicated communication links may be used to connect the various devices in accordance with an example embodiment.

The mobile carrier networks 180a, 180b may include any cellular telecommunication network, each operated by a respective mobile network operator. The mobile carrier networks may be implemented to operate according to one or more wireless technology formats, including, but not limited to, CDMA, GSM, UWC, UMTS, GPRS, and/or any "generation" or version thereof. Accordingly, in one embodiment, each mobile device 150a, 150b is configured to operate primarily on a certain carrier network 180a, 180b as operated by the mobile network operator with which the mobile device end user has an agreement and with which the mobile device is registered. It is appreciated, however, that, according to various embodiments, mobile devices 150a, 150b and carrier networks 180a, 180b may be configured to permit interoperability of mobile devices on non-registered carrier networks 180a, 180b.

Generally, each of the memories and data storage devices, such as the memories 112, 142a, 142b, 152a, 152b, 162a, 162b and the databases 138, and/or any other memory and data storage device, can store data and information for subsequent retrieval. In this manner, the system 100 can store various received or collected information in memory or a database associated with one or more of the TSM computer(s) 110, the MNO computer(s) 140a, 140b, the mobile devices 150a, 150b, and/or the service provider computer(s) 160a, 160b. The memories and databases can be in communication with each other and/or other databases, such as a centralized database, or other types of data storage devices. When needed, data or information stored in a memory or a database may be transmitted to a centralized database capable of receiving data, information, or data records from more than one database or other data storage devices. In other embodiments, the databases shown can be integrated or distributed into any number of databases or other data storage devices.

Suitable processors, such as the processors 116, 146a, 146b, 156a, 156b, 166a, 166b, may comprise a microprocessor, an application-specific integrated circuit ("ASIC"), and/or state machine. Example processors can be those provided by Intel Corporation (Santa Clara, Calif.), AMD Corporation (Sunnyvale, Calif.), and Motorola Corporation (Schaumburg, Ill.). According to various embodiments, one or more of the computers can be configured as a multi-processor computer having multiple processors 116, 146a, 146b, 156a, 156b, 166a, 166b providing parallel and/or redundant processing capabilities. Such processors comprise, or may be in communication with, media, for example, computer-readable media, which stores instructions that, when executed by the processor, cause the processor to perform the elements described herein. Embodiments of computer-readable media include, but are not limited to, an electronic, optical, magnetic, or other storage or transmission device capable of providing a processor with computer-readable instructions. Other examples of suitable media include, but are not limited to, a floppy disk, pen drive, CD-ROM, DVD, magnetic disk, memory chip, ROM, RAM, EPROM, EEPROM, a configured processor, all optical media, all magnetic tape or other magnetic media, or any other medium from which a computer processor can read instructions. Also, various other forms of computer-readable media may transmit or carry instructions to a computer, including a router, gateway, private or public network, or other transmission device or channel, both wired and wireless. The instructions may comprise code from any computer-programming language, including but not limited to, assembly, C, C++, C#, Visual Basic, Java, Python, Perl, JavaScript, GPSS, LISP, SAS, Parlay, JAIN, or Open Mobile Architecture.

The system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. In addition, the designation of system components by "a" and "b" is not intended to limit the number of possible components, but instead are provided for illustrative purposes to indicate that more than one of the respective components can be provided. Accordingly, embodiments of the invention should not be construed as being limited to any particular operating environment, system architecture, or device configuration.

Figure 2:
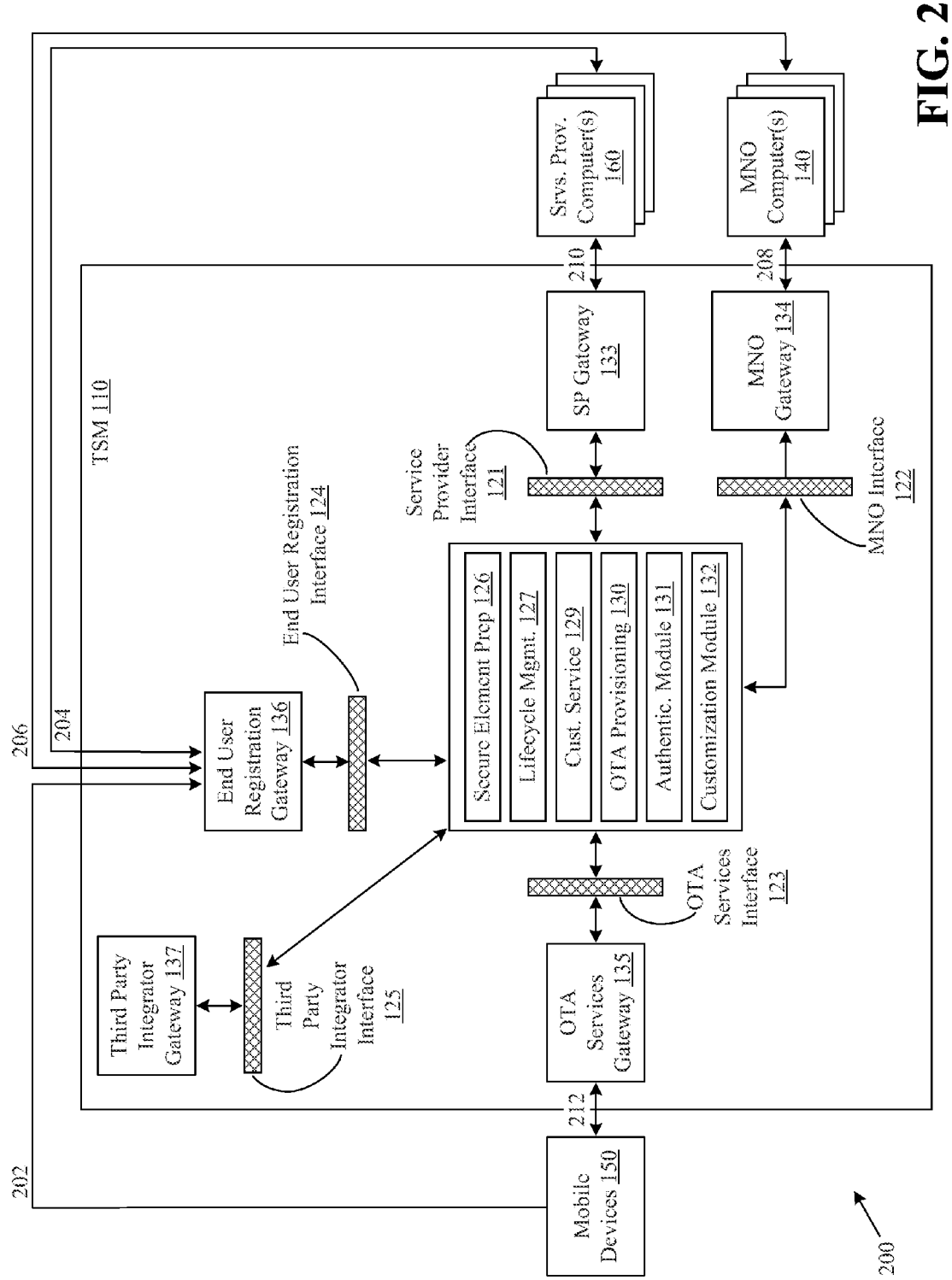
FIG. 2 illustrates a block diagram of an example trusted service management integration and associated data flow, according to an example embodiment of the invention.

FIG. 2 illustrates an example block diagram 200 illustrating data flow and integration points between the TSM computer 110 and the various other entities that may participate in mobile device application provisioning, integration, authentication, and maintenance, such as multiple service provider computers 160, multiple MNO computers 140, and multiple mobile devices 150, according to one embodiment of the invention. An example operation of the block diagram 200 of FIG. 2 will be described separately and in conjunction with the flow diagrams of FIGS. 3-6.

As generally described above, a TSM and associated TSM computer 110 may be operable to load, delete, and manage mobile device applications and associated end user data on mobile devices on behalf of multiple service providers. Additionally, the TSM computer 110 may be operable to facilitate the authentication of mobile devices. According to various embodiments, the TSM computer 110 may be operable to provide, but is not limited to, one or more of the following functions: to act as a single point of integration between service providers, MNOs, and other TSMs; to load mobile device applications over the air to mobile devices; to accept, prepare and personalize mobile device application end user data; to allow service providers to interact with end users over one or more of the carrier networks for registration and communications; to enable a service provider to authenticate the end user requesting personalization of an application; to manage secured keys (e.g., cryptographic keys, master keys, rotated keys, private keys, transaction specific keys, etc.) used for application provisioning, personalization, and/or authentication of mobile devices; to manage mobile device application lifecycles on behalf of service providers over the life of an application; to manage mobile device lifecycles on behalf of MNOs over the life of a handset; and to provide billing and other administration functions to support relationships between MNOs and service providers, and between the TSM and each MNO and service provider.

Various services provided by the TSM computer 110 can be implemented by one or more of the following application modules: the secure element preparation module 126, the lifecycle management module 127, the workflow management module 128, the customer service module 129, the over the air provisioning module 130, the authentication module 131, and the services customization module 132.

The secure element preparation module 126 may be configured to facilitate preparing mobile device secure elements, such as requesting increased space allocated on the secure element for provisioning applications and verifying secure element properties with the MNO. According to various embodiments, the secure element preparation module 126 may further be configured to receive and/or provide personalization data associated with mobile device applications for each end user during provisioning. In one example, a service provider computer 160 may provide personalization data via the service provider gateway 133. As another example, the TSM computer 110 may generate personalization data via the secure element preparation module 126. As yet another example, the TSM computer 110 may coordinate application personalization and/or secure element preparation via one or more third entities.

The lifecycle management module 127 may be configured to facilitate tracking the status of users' mobile devices and the status of previously provisioned applications. For example, the lifecycle management module 127 may be configured to maintain inventories of various types of mobile devices, associated secure elements and the state of the secure elements and applications (active, locked, unlocked, terminated), which may be used to track the status of applications and mobile devices, and to communicate with MNOs and/or service providers regarding the provisioned applications, the mobile devices, the end user, etc. In addition, the lifecycle management module 127 may be configured to coordinate initial application requests, application personalization, secure element preparation, and provisioning; coordinate any third party entities participating in the provisioning process; maintain statuses; and facilitate billing and payment (e.g., MNO fees, service provider payments, etc.).

The workflow management module 128 may be configured to maintain and manage the workflow of events between MNOs and service providers. For example, when the MNO reports a lost or stolen handset to the TSM, the TSM may trigger a series of events to the service providers to prevent fraudulent transactions. In turn, the workflow management module 128, based on service provider rules, may instruct the lifecycle management module to send one or more commands to the mobile device to lock or terminate applications.

The customer service module 129 may be configured to receive and respond to customer service requests, including those from end users, service providers, and/or MNOs. According to one embodiment, the TSM computer 110 and associated customer service module 129 may provide triage and management functions between the various responsible entities (e.g., service providers and MNOs), and/or provide initial or more involved levels of customer service.

The over the air provisioning module 130 may be configured to facilitate the OTA provisioning of mobile device applications and associated end user data with multiple mobile devices. As described in more detail herein, the OTA provisioning module 130 may facilitate communications with third party OTA provisioning providers via the OTA services gateway 135, and/or can facilitate direct provisioning by the TSM computer 110. It is appreciated that, according to some embodiments, the functions of the OTA provisioning module 130 may also be implemented in one or more of the MNO computers 140 and/or within functions implemented by the carrier networks 180a, 180b, either instead of, or in combination with, those provided in the TSM computer via the OTA provisioning module 130.

The authentication module 131 may be configured to provide administration and maintenance functions for secured keys (e.g., cryptographic keys, master keys, public keys, private keys, etc.) in accordance with TSM security policies, MNO security policies, and/or service provider security policies. Various functions performed by the TSM computer 110 may integrate with the authentication module 131 to provide security for end users, MNOs, and service providers in association with each of the TSM services.

According to an aspect of the invention, the authentication module 131 may be configured to format key information, such as rotated key information, for communication to a mobile device and/or provisioning or storage on a secure element associated with the mobile device. In this regard, the mobile device may be authenticated during subsequent requests (e.g., provisioning requests, etc.). Additionally, in certain embodiments, the authentication module 131 may be configured to format an authentication module for communication to a mobile device and/or provisioning on the secure element. For example, based upon the authentication of the mobile device utilizing a rotated key that was previously provided to the mobile device, an authentication module may be provisioned to the mobile device. In certain embodiments, the authentication module may be utilized to generate transaction specific keys (e.g., DUKPT keys, etc.) for encrypting and/or decrypting communications between the TSM computer 110 and the mobile device.

In addition to providing a rotated key and/or other authentication information to a mobile device, the authentication module 131 may be configured to receive and direct the storage of identification information associated with the mobile device, such as CPLC information and/or information associated with a secure element of the mobile device. In certain embodiments, the authentication module 131 may update or modify the identification information, store the updated information, and/or provide the updated information to the mobile device and/or the secure element. For example, CPLC information may be updated, and the updated CPLC information may be provided to the mobile device and utilized during subsequent authentications of the mobile device. Additionally, in certain embodiments, the authentication module 131 may utilize at least a portion of identification information or the updated identification information to generate or derive the rotated key that is provided to the mobile device and/or the secure element.

The services customization module 132 may be configured to facilitate customization and selection of services offered by the TSM to each service provider and MNO. As is apparent by that described and illustrated herein, the TSM computer 110 may be configured to provide a variety of features and functions associated with mobile device application provisioning and integration between the service providers and MNOs. Accordingly, due at least in part to the simplified common interfaces and gateways (e.g., MNO gateway 134 and MNO interface 122, service provider gateway 133 and service provider interface 121, etc.), the TSM computer 110 may permit each service provider and MNO to customize from the services available. The services customization module 132 may be configured to include computer-executable program logic to generate an interface for selecting and customizing TSM services, and to coordinate the implementation by other TSM application modules. For example, a first service provider may opt to only provide mobile device applications to mobile devices operating on certain carrier networks, while a second service provider may opt to provide mobile device applications to all mobile devices irrespective of the associated carrier networks. As another example, a service provider may request the TSM computer 110 to provide end user registration functionality on behalf of the service provider, while a second service provider provides its own registration services and integrates via the end user registration gateway 136 and associated end user registration interface 124. Accordingly, the customization module may permit coordinating and implementing the appropriate combination of features and integration points as requested by service providers and MNOs. It is appreciated that any combination of features and integration points may be provided by the TSM computer 110, and that these are provided for illustrative purposes only. In one implementation, the customizations provided may be driven at least in part by contractual relationships between the TSM and respective service providers and MNOs, such that the TSM may also support and/or enforce these contractual agreements as part of the features of the services customization module 132.

The MNOs and associated MNO computers 140 may be operable to provide the communications channel to reach and provision mobile device applications and associated end user data on end users' mobile devices. According to various embodiments, each MNO computer 140 may be operable to provide, but is not limited to, one or more of the following functions: provide the TSM computer with information on mobile device secure elements and unique mobile device identity modules (e.g., Universal Subscriber Identity Modules ("USIMs")) throughout the lifecycle; provide a communications gateway via a respective carrier network for OTA provisioning of mobile device applications; provide a mobile device user interface for accessing provisioned mobile device applications on each mobile device (e.g., a mobile wallet); facilitate management of secured keys used to securely load and delete mobile device applications on mobile device secure elements; interface with the TSM computer; facilitate authentication of the end user interfacing with the TSM; facilitate allocating memory for mobile device applications on the end users' mobile devices; communicate to the TSM computer that unique end user identity modules have changed; communicate to the TSM computer the status of unique mobile device identity modules (e.g., which USIMs have been lost, stolen, damaged, replaced by new mobile devices, etc.); and facilitate management of any tariffs and fees associated with application provisioning communications.

An MNO gateway 134 and associated MNO interface 122 are operable for providing a common point of integration between the TSM computer 110 and the multiple MNO computers 140. According to one embodiment, the MNO interface 122 is configured to communicate with each MNO according to the same common MNO message standard, as described further herein. Moreover, according to various embodiments, the MNO gateway 134 and associated MNO interface 122 are further operable to permit the TSM computer 110 to communicate with mobile devices 150 via a respective carrier network operated by each MNO.

The service providers and associated service provider computers 160 are operable to provide one or more services in which mobile device end users participate (e.g., financial services, membership services, loyalty account services, etc.). Accordingly, the service providers represent the entities that generate and/or provide mobile device applications associated with these services that are provisioned via the TSM computer 110 on end users' mobile devices. A service provider generating and providing the mobile device applications may be the same service provider that operates the underlying service, or may be a service provider providing the mobile device applications on behalf of another service provider operating the underlying service. According to various embodiments, each service provider computer 160 may be operable to provide, but is not limited to, one or more of the following functions: supply a mobile device application for loading onto the mobile devices of its end users (e.g., customers of the service provider); request the use of and/or provisioning of TSM-created soft-card applications (e.g., electronic application permitting payment or other features that can be used in association with participating service provider transactions); facilitate end user authentication processes and associated information; facilitate the creation and maintenance of end user application accounts (e.g., financial account if the service provider is a financial institution or payment processor, membership or loyalty account if the service provider is a retailer or other merchant, etc.); provide end user support for their provisioned mobile device applications; receive application messages from mobile devices returned via one or more of the carrier networks; facilitate processing contactless transactions associated with the provisioned mobile device applications (e.g., a payment transaction at a retailer, etc.); facilitate management and maintenance of application-related secured keys and share these keys with the TSM computer; and facilitate mobile device application personalization and/or coordinate with TSM to prepare personalization data.

A service provider gateway 133 and associated service provider interface 121 are operable for providing a common point of integration between the TSM computer 110 and the multiple service provider computers 160. According to one embodiment, the service provider interface 121 is configured to communicate with each service provider according to the same common service provider messaging standard, as described further herein.

The mobile devices 150 represent the respective end users that have contractual relationships with the MNOs (e.g., for operating on a respective carrier network) and with the service providers (e.g., for participating in one or more services offered by the service providers). Accordingly, end users may utilize the mobile devices 150 to register for, request, and activate mobile device applications from service providers via the TSM computer 110. According to various embodiments, each mobile device 150 may be operable to provide, but is not limited to, one or more of the following functions: activate mobile devices and/or secure elements with an MNO; register for and request mobile device applications from a service provider (or agent of the service provider) or from an MNO; download mobile device applications and associated end user data on mobile device secure elements; authenticate the respective end user and/or mobile device to the service provider to permit application personalization; activate applications with the respective service providers; perform transactions using the provisioned mobile device applications (e.g., a payment transaction at a retailer, etc.);

initiate customer service requests (e.g., with the respective MNO, with service providers, with the TSM, with other third party entities, etc.); notify the respective MNO of a new mobile device and/or secure element; and alter end user settings associated with provisioned mobile device applications (e.g., change or reset a PIN, cancel a mobile device application, cancel an MNO relationship, etc.).

An OTA services gateway 135 and associated OTA services interface 123 are operable to facilitate provisioning of mobile device applications and associated end user data to end users' mobile devices 150. According to one embodiment, the OTA services gateway 135 may be configured to permit the TSM computer 110 to transact with third party OTA provisioning providers to perform all or some of the OTA provisioning services with mobile devices 150, such as by utilizing a common provisioning messaging standard for all third party OTA provisioning providers in a manner similar to that described with reference to the MNO interface 122 and service provider interface 121. According to another embodiment, the OTA services gateway 135 may be configured to permit the TSM computer 110 to provision mobile device applications and associated end user data directly to the mobile devices 150, such as via one or more carrier networks. According to various embodiments, the MNO gateway 134 and associated MNO interface 122 may be utilized at least in part to provide OTA provisioning by the TSM computer 110, such as for accessing and communicating over a respective MNO carrier network.

An end user registration gateway 136 and associated end user registration interface 124 are operable to facilitate communications with mobile device end users for registering to receive mobile device applications, requesting mobile device applications, updating status on mobile devices 150 and/or provisioned applications, and the like. According to one embodiment, service provider computers 160 and/or MNO computers 140 provide registration applications for end users (e.g., mobile device-based registration interface, Internet-based registration interface, etc.). Thus, the end user registration gateway 136 and associated end user registration interface 124 provide a common integration point and associated common messaging standard for receiving and responding to such requests in a manner similar to that described with reference to the MNO interface 122 and service provider interface 121. According to another embodiment, the TSM computer 110 may be configured to provide similar registration services to mobile device end users, such as may be performed on behalf of the service providers or MNOs. According to various embodiments, the MNO gateway 134 and associated MNO interface 122 may be utilized at least in part to provide end user registration functions by the TSM computer 110, such as for transmitting and receiving registration data over a respective MNO carrier network. According to various embodiments, the service provider gateway 133 and associated service provider interface 121 may be utilized at least in part to provide end user registration functions by the TSM computer 110, such as for end user authentication.

A third party integrator gateway 137 and associated third party integrator interface 125 are operable to facilitate communications with one or more third party integrators, such as may occur when sharing responsibilities or otherwise communicating with other TSMs. Much like that described with reference to the MNO interface 122, MNO gateway 134, service provider interface 121, and service provider gateway 133, the third party integrator gateway 137 and associated third party integrator interface 125 provide a common integration point and associated common messaging standard for communicating with any third party integrators.

Figure 3:
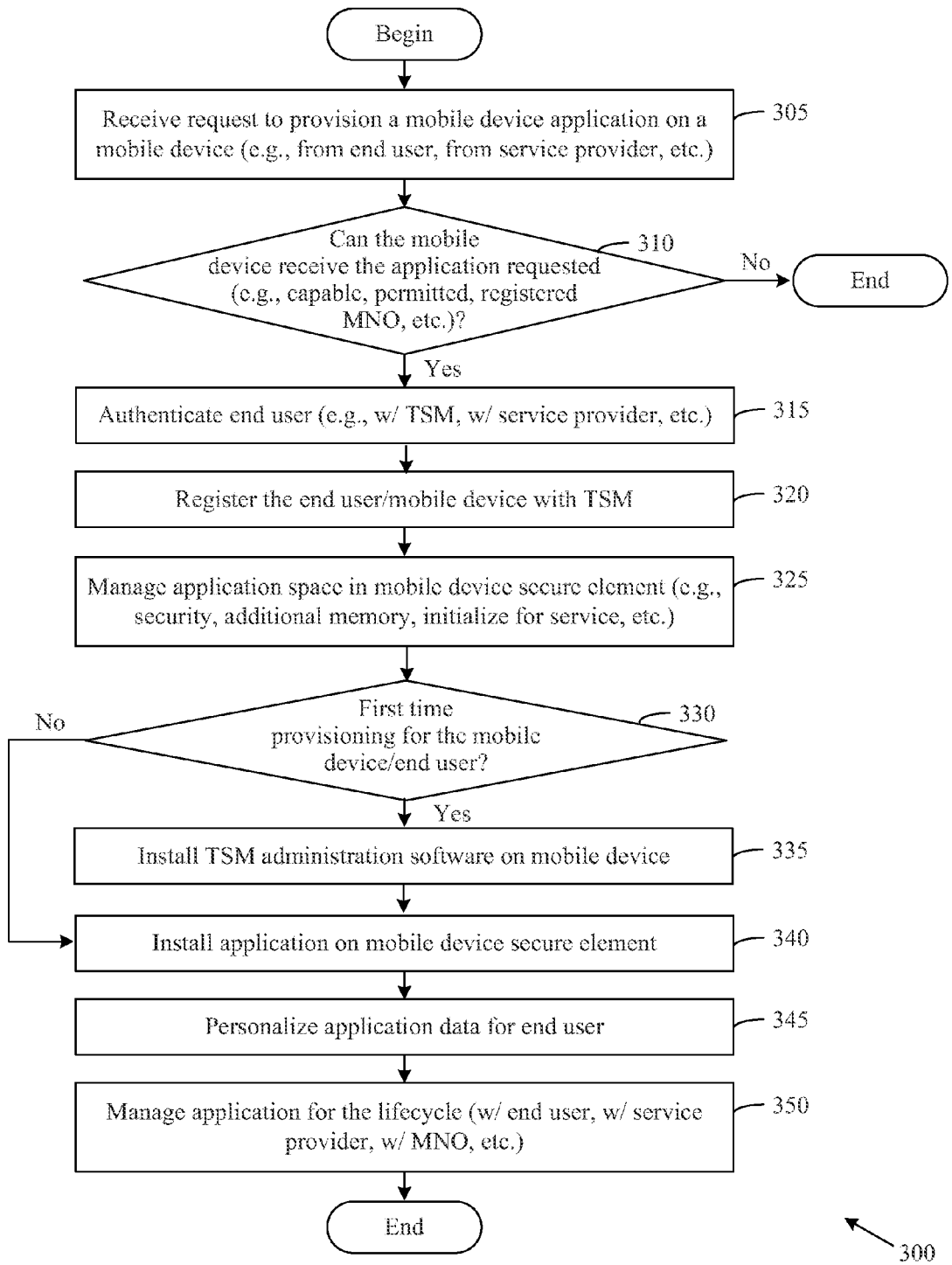
FIG. 3 illustrates a flow diagram of an example process for providing provision and integration services, according to an example embodiment of the invention.

With reference to FIG. 3, a flow diagram is provided illustrating an example method 300 for providing provisioning and integration services by a TSM computer 110, according to one embodiment. The method 300 is described also with reference to the block diagram 200 of FIG. 2.

By example only, the steps illustrated and described with reference to FIG. 3 can be performed to facilitate the provisioning of any mobile device application, such as a near field communication ("NFC") payment application provided by a payment service provider (e.g., card account issuer, financial institution, etc.). Thus, a mobile device user would request the installation of the NFC payment application on an associated mobile device from either the TSM or directly from a service provider providing the NFC payment application. The request ultimately would be transmitted to the TSM, such as via the end user registration gateway 136 and end user registration interface 124 if coming directly from the end user, or via the service provider gateway 133 and the service provider interface 121 if coming via a service provider. Upon receiving the request, the TSM computer then may verify whether the end user's mobile device is capable of receiving installs, whether a secure element associated with the end user's mobile device is adequately configured (e.g., can support an install, sufficient space, etc.). The TSM computer may then perform the necessary steps to prepare the end user's mobile device and associated secure element, either directly and/or via the end user's mobile network operator. In addition, the TSM may perform the various authentication measures to verify the end user, the end user's mobile device, and set up and personalize the NFC payment application for installation on the end user's secure element. After the NFC payment application is personalized and authentication and security measures are in place at the TSM computer, the NFC payment application may be provisioned to the end user's mobile device, such as via the OTA services gateway 135 and the OTA services interface 123 and/or via the MNO gateway 134 and the MNO interface 122 for interfacing with the end user's mobile network operator. After provisioning, the lifecycle of the NFC payment application for that end user may be managed via the TSM computer, such as via the lifecycle management application 127. Various services can be provided and/or otherwise facilitated by the TSM computer, such as handling service requests from the end user, the MNO, and the service provider; coordinating billing between the MNO and the service provider; facilitating updates to the application; and any other communications that may be required between the MNO, the service provider, the end user's mobile device, and/or the end user. It is appreciated that this description of provisioning and servicing an NFC payment application is provided for illustrative purposes, and the methods described with reference to FIG. 3 may be performed for any type of mobile device application between any of a number of parties.

The method 300 may begin at block 305, in which the TSM computer receives a request to provision a mobile device application on a mobile device. According to various embodiments, a provisioning request may come from any of the mobile devices 150 or associated end users, service provider computers 160, MNO computers 140, or associated websites or other network-routed requests. For example, a mobile device end user may transmit a registration request for a certain mobile device application as part of an end user communication 202, whereby the request is received via the end user registration gateway 136. In another example, a service provider registration request 204 is transmitted from a service provider to the end user registration gateway 136 according to a common service provider messaging standard, such as may occur when an end user requests an application via a service provider or when a new application version of a previously provisioned application is available. In yet another example, an MNO registration request 206 is transmitted from the MNO computer 140 to the end user registration gateway 136 according to a common MNO messaging standard, such as may occur if an MNO provides application registration and requests features on behalf of one or more service providers.

Following block 305, operations may continue at block 310. At decision block 310, a determination may be made as to whether the mobile device 150 is capable and/or is permitted to receive an OTA provisioned application. For example, it may be determined whether the mobile device is technically capable of receiving an OTA provisioned application or capable of operating the specific application requested, whether enough memory is available, etc., which may be obtained from the MNO computer 140 via the MNO gateway 134 utilizing MNO communications 208. In another example, it may be determined whether the mobile device and end user are permitted to receive the application requested, such as whether the end user's contract with the MNO or the service provider permits installation and/or use of the application, which may be obtained from the MNO computer 140 by MNO communications 208 sent via the MNO gateway 134 or from the service provider computer 160 by service provider communications 210 sent via the service provider gateway 133, respectively. It is appreciated that any other factor may be considered when determining whether the mobile device can receive the application at decision block 310, as may be desired.

If it is determined at block 310 that the mobile device cannot receive the mobile device application requested, then the method 300 may end. According to various embodiments, the TSM computer 110 may be configured to transmit a failure or status update to the mobile device, end user, MNO, service provider, and/or any other entity or individual. If, however, it is determined at block 310 that the mobile device may receive the mobile device application requested, then operations may continue at block 315.

At block 315, the TSM computer 110 may perform authentication processing of the end user and/or the end user's mobile device. For example, the identity of the mobile device end user may be verified as the correct end user for receiving the mobile device application and/or associated personalization data, and/or that the mobile device is in the correct end user's possession. According to one embodiment, the TSM computer 110 is operable to at least partially perform end user authentication, such as by receiving end user authentication data as part of an end user communication 202 and processing the end user authentication data against service provider provided authentication data and/or TSM stored authentication data. However, according to other embodiments, the respective service provider can authenticate customers directly via the service provider computer 160. According to yet another embodiment, a combination of the TSM computer 110 and the service provider computer 160 may perform end user authentication, such as by receiving authentication data as part of the end user communication data 202 directly via the end user registration gateway 136, processing the authentication data in part by the TSM computer 110, and communicating authentication data and responses with the service provider computer 160 by the service provider communications 210 sent via the service provider gateway 133, according to the common service provider messaging standard. If it is determined that the end user is not authenticated, then the method 300 may terminate, or may re-attempt authentication.

If the end user is authenticated at block 315, then block 320 follows. At block 320, the end user and/or the mobile device is registered with the TSM, because it was previously determined at block 310 that the mobile device and/or the user has not yet received an application via the TSM. According to various embodiments, as part of the registration process, the TSM computer 110 may be configured to store unique identifiers of the mobile device, its secure element, and/or the end users for subsequent processing. For example, according to one embodiment, the TSM computer 110 may store a Mobile Subscriber Integrated Services Digital Network Number ("MSISDN"), Integrated Circuit Card ID ("ICCID"), an International Mobile Subscriber Identity ("IMSI"), and/or card production life cycle ("CPLC") information to uniquely identify the end user and associated mobile device. According to other embodiments, however, any unique identifier may be used, such as may be provided by the end user or by the MNO.

Following block 320 is block 325, in which the TSM computer 110 facilitates the management of the application space on the mobile device secure element or other memory device associated with the mobile device. As part of this process, additional space may be provisioned via the MNO, secured keys may be provided (e.g., by the TSM or by the MNO), privileges associated with the secure element (or other memory device) may be added or changed, and/or the mobile device may be initialized for utilizing the mobile device application (e.g., initialized for NFC transactions, etc.). It is appreciated that various other steps may be performed as part of preparing the secure element for provisioning the requested application. According to various embodiments, some or all of these steps are initiated by the TSM computer 110 but performed at least in part by an MNO computer 140 communicating directly with the mobile device (e.g., via wireless communications over the respective carrier network, via Internet-based communications, etc.). Though, according to other embodiments, the TSM computer 110 and the associated secure element preparation module 126 and/or OTA provisioning module 130 are operable to facilitate preparing and managing the application space on the mobile device secure element at block 325 via OTA communications 212 from the TSM computer 110 to the mobile device 150 via the OTA services gateway 135 (which, according to various embodiments, may also utilize the MNO gateway 134).

Following block 325 is decision block 330, in which a determination may be made as to whether the mobile device and/or end user associated with the mobile device has previously received a mobile device application via the TSM computer 110. If the TSM computer 110 has previously provisioned an application on the mobile device, then it may be assumed that the end user and/or mobile device is registered with the TSM, has TSM administration software installed, and is capable of OTA application installations. However, if the mobile device has not yet participated in OTA provisioning via the TSM computer, then additional steps may be performed to validate the capabilities and permissions to receive the application. If it is determined at block 330 that the mobile device and/or the end user has previously received a mobile device application via the TSM computer, then operations may continue at block 340 described below.

If, however, it is determined at block 330 that the mobile device and/or the end user has not previously received a mobile device application via the TSM computer, then operations may continue at block 335, and the TSM computer 110 may install TSM administration software on the mobile device 150 that may be utilized to provide secured access to secure elements and further facilitate installing, accessing, and operating TSM-provisioned applications. The TSM computer 110 may install the TSM administration software on the mobile device also by OTA communications 212 sent via the OTA services gateway 135. It is appreciated that, according to another embodiment, a third party OTA provisioning provider may perform some or all of the application installation functions. In another embodiment, the MNO may generate and/or provide TSM administration software capable of accessing and operating TSM-provisioned applications. In one embodiment, the TSM administration software may be utilized to install, access, and operate all mobile device applications provided by all service providers. Though, in another embodiment, multiple administration software applications may be required, such as may occur when certain service provider applications require specialized administration software.

Following block 335 is block 340, in which the requested application may be installed on the secure element (or other memory device) of the mobile device 150. According to one embodiment, the requested application is installed by the TSM computer 110 by communicating directly with the mobile device via the OTA services interface 123 by transmitting application data in the OTA messaging according to the standard required by the specific secure element, mobile device, and/or carrier network technology, such as via Wireless Application Protocol ("WAP"), Short Messaging Service ("SMS"), Multimedia Messaging Service ("MMS"), etc. It is appreciated that, while each of the gateways and associated interfaces described herein are designed to promote a common integration point and common messaging standards to simplify integration and system flexibility, various mobile devices and carrier networks may operate according to a number of wireless technologies, each of which may cause application provisioning processing to be performed differently according to each of the various wireless network technologies. According to another embodiment, however, instead of the TSM computer 110 provisioning the requested application, a third party OTA provisioning provider may perform some or all of the application installation functions. According to this embodiment, the OTA services gateway 135 and associated OTA services interface 123 can be configured to implement a common provisioning messaging standard for communicating with each of the possible third party OTA provisioning providers.

Following block 340 is block 345, in which personalization data associated with the requested mobile device application may be prepared and transmitted to the mobile device. According to one embodiment, personalization data may be generated by the TSM computer 110 from data supplied by the service provider computer 160 via service provider communications 210 in the common service provider messaging format. According to other embodiments, personalization data may be created by the TSM computer 110 based on stored data, or created by a third party entity for providing personalization data. The format and content of personalization data can vary, depending on the mobile device application to be provisioned. Moreover, it is further appreciated that, according to another embodiment, the personalization application data or other associated end user data can be transmitted at or near the same time as the application is provisioned on the mobile device at block 340.

Following block 345 is block 350, in which the TSM computer 110 is operable to manage the provisioned application during its lifetime as installed on the secure element associated with the mobile device 150. For example, as an application is installed at block 340, the TSM computer 110 may be operable to record application installation status, including successes and failures, as may be provided by the lifecycle management module 127. The TSM computer 110 and associated lifecycle management module 127 may thus be configured to track statuses associated with the provisioned application, such as may be utilized to respond to various service provider or MNO requests, to provide periodic updates to service providers and/or MNOs, or to facilitate billing and payment functions. Application status messages can be transmitted as MNO communications 208 via the MNO gateway 134 and/or as service provider communications 210 via the service provider gateway 133, each according to the common MNO and service provider messaging standards, respectively.

In one example, in response to a request from a service provider computer 160 regarding a specific end user (e.g., as identified by name, account, or other unique identifier), the TSM computer 110 is operable to identify the end user as having a TSM-provisioned application installed. The TSM computer 110 may identify the end user by a secure element identifier (e.g., the ICCID, IMSI, etc. associated with the secure element). The mobile phone number (i.e., MSISDN) may be used as a secondary identifier of the end user. Upon identifying the end user, the TSM computer may perform one or more of, but not be limited to, the following functions when managing the application lifecycle: check the application state on an end user mobile device and/or secure element; update an application version on an end user mobile device and/or secure element; lock or unlock an application on an end user mobile device or secure element; remove an application from an end user mobile device or secure element; process a request indicating that the mobile device and/or secure element is lost or stolen; update a customer phone number and mobile device; update a secure element identity (e.g., ICCID); update an end user's authentication data; process an MNO subscriber cancellation; process a service provider end user cancellation; process application service messages; send an end user and/or mobile device MNO or service provider messages; or lock or unlock one or more of the provisioned applications.

The method 300 may end after block 350, having facilitated the provisioning of mobile device applications and integrating multiple service providers with multiple MNOs and their registered mobile devices, by providing a trusted service manager that promotes simplified integration via common gateways and interfaces implementing common messaging standards.

According to an aspect of the invention, methods for authenticating mobile devices and/or mobile device communications may be provided. In certain embodiments, a rotated key may be generated for a mobile device. For example, a rotated key may be generated during the registration of a mobile device with a TSM computer 110. As desired, identifying information for the mobile device and/or a secure element may also be updated and provided to the mobile device and/or utilized to derive the rotated key. The rotated key and/or the updated information may then be provided to the mobile device and utilized to facilitate subsequent authentication of the mobile device.

Figure 4:
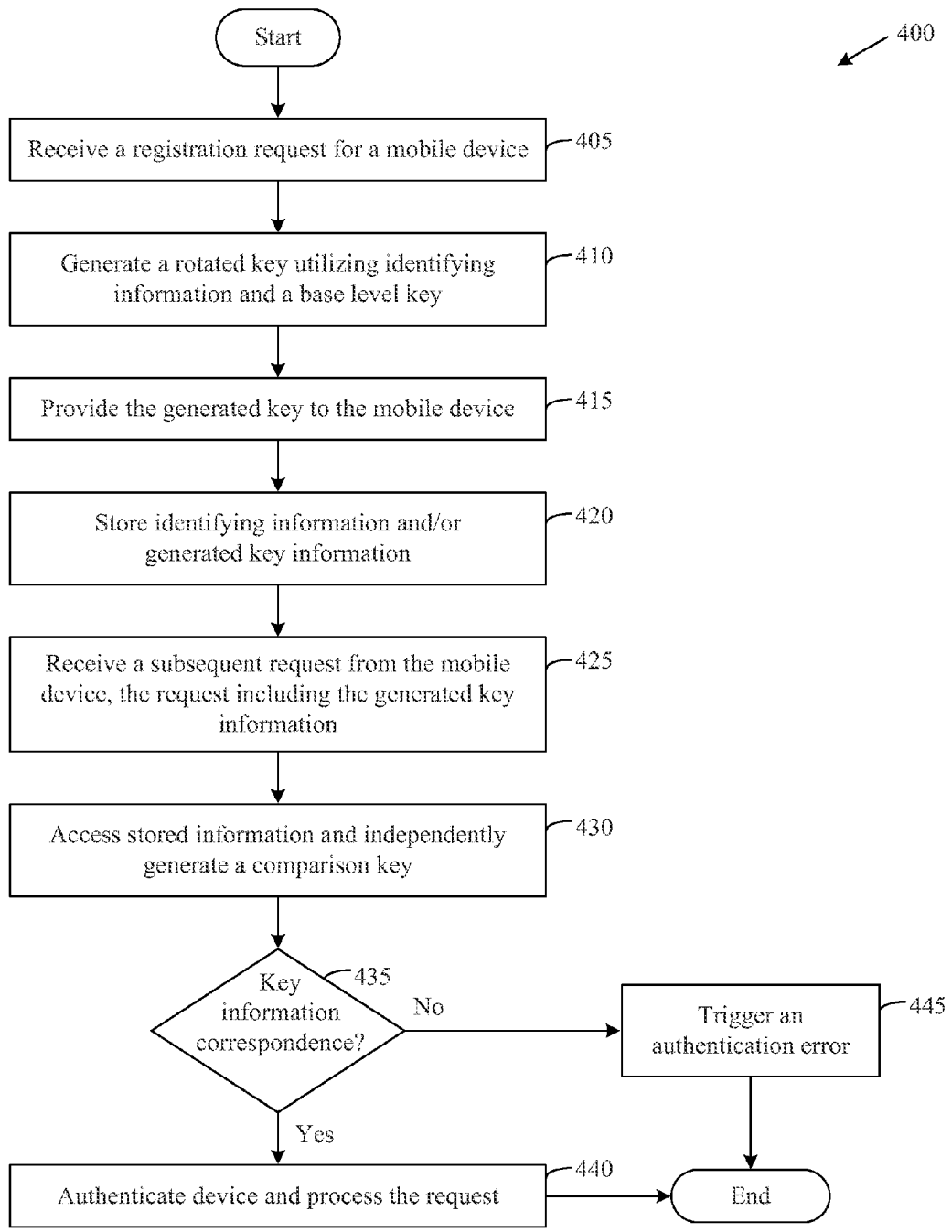
FIGS. 4 and 7 illustrate flow diagrams of example processes for authenticating a mobile device, according to example embodiments of the invention.

FIG. 4 illustrates a flow diagram of an example method 400 for authenticating a mobile device, according to an example embodiment of the invention. The method 400 may be performed by a suitable trusted service management system, such as the system 100 illustrated in FIG. 1. The method 400 may begin at block 405.

At block 405, a registration request may be received for a mobile device, such as one of the mobile devices 150 illustrated in FIG. 1. For example, a registration request may be received based upon an initial activation of the mobile device 150. During the initial activation (or following an update of the mobile device 150), the mobile device 150 may attempt to register the mobile device and/or the secure element with a TSM computer 110 or TSM system. As another example, a user of a mobile device 150 may request the provisioning of an application, account, or other data, and a registration request may be communicated from the mobile device 150 to the TSM computer 110 in association with the provisioning request. Alternatively, a registration process may be initiated based upon the processing of a provisioning request. For example, during the processing of a provisioning request, a determination may be made that the mobile device 150 has not previously been registered with the TSM computer 110, and a registration process may be initiated.

According to an aspect of the invention, identifying information or identification information for the mobile device 150 and/or a secure element associated with the mobile device may be received in conjunction with a registration request and/or during a communications session (e.g., a secure communications session) established in association with a registration request. A wide variety of identifying information may be received as desired in various embodiments of the invention, such as card production life cycle ("CPLC") information and/or identifying information associated with a secure element (e.g., the ICCID, IMSI, etc.). CPLC information may include variable length data associated with any integrated circuit ("IC") incorporated into the mobile device 150, such as a secure element chip and/or a subscriber identity module ("SIM") card. A wide variety of information may be included in CPLC data, including but not limited to, an identifier of an IC fabricator, an IC type, an operating system identifier, an operating system release date, an operating system release level, an IC fabrication date, an IC serial number, an IC batch identifier, an IC module fabricator, an IC module packaging date, an IC manufacturer, an IC embedding date, an IC pre-personalizer identification, an IC pre-personalizer equipment date, an IC pre-personalizer equipment identifier, an IC personalizer identifier, an IC personalization date, and/or an IC personalization equipment identifier. In certain embodiments, CPLC data may be provided by a chip and/or a mobile device as a tag or data string.

At block 410, a rotated key may be generated, determined, or derived for the mobile device 150 and/or the secure element. In certain embodiments, a base level key, such as a master key determined by a mobile device manufacturer, may be utilized to generate or derive the rotated key. Additionally, a wide variety of suitable rotation techniques (e.g., a key schedule, etc.) and/or other methods or derivation techniques may be utilized as desired to derive a rotated key. For example, additional information may be combined with the base level key during a derivation of a rotated key. In certain embodiments, at least a portion of the received identifying information, such as CPLC information and/or an identifier of the secure element, may be utilized in conjunction with the base level key to derive a rotated key. For example, an identifier of the secure element may be combined (e.g., added, multiplied, etc.) with the base level key to derive a rotated key for the mobile device 150.

As a result of the key rotation process, the mobile device 150 and/or the secure element may be validated by the TSM computer 110. For example, a determination may be made as to whether the mobile device 150 is a valid device that has been produced by a suitable device manufacturer and/or associated with a suitable MNO 140. In certain embodiments, identifying information received from the mobile device 150 may be compared to expected identifying information in order to facilitate a validation of the mobile device 150. For example, received CPLC data may be compared to stored CPLC data that was previously received from another entity, such as a device manufacturer. Based at least in part upon the comparison, a determination may be made as to whether the mobile device 150 is a valid device. If it is determined that the mobile device 150 is not a valid device, then the registration process may end, and any number of suitable errors and/or exceptions may be triggered. Otherwise, the registration process may continue.

Additionally, in certain embodiments of the invention, identifying information for the mobile device 150 may be modified or updated by the TSM computer 110. For example, received CPLC information may be modified or updated by the TSM computer 110. A wide variety of different aspects of CPLC information and/or identifying information may be updated as desired in various embodiments, such as date information, version information, key version information, etc. In certain embodiments, the updated identifying information may be utilized in the derivation of a rotated key.

At block 415, the generated or derived rotated key and/or any updated identifying information may be provided by the TSM computer 110 to the mobile device 150. For example, the rotated key and/or identifying information may be provisioned or otherwise provided to a secure element of the mobile device 150. In this regard, the rotated key may be utilized by the mobile device 150 to encrypt subsequent communications, such as provisioning requests, transmitted to the TSM computer 110. Additionally, at block 420, the TSM computer 110 may store or direct the storage of the generated rotated key and/or identifying information in one or more suitable memory devices, such as the databases 138 illustrated in FIG. 1. In this regard, the TSM computer 110 may access the information to facilitate an authentication of the mobile device 150 at a subsequent point in time, such as during the processing of a provisioning request.

At block 425, a subsequent request or other communication may be received from the mobile device 150. For example, a request for the TSM computer 110 to provision an application or a payment account may be received. In accordance with an aspect of the invention, the request or communication may be encrypted with the rotated key previously provided to the mobile device 150. Additionally, in certain embodiments, the request or communication may include identifying information for the mobile device 150, such as a portion of updated identifying information previously provided to the mobile device 150.

At bock 430, stored information associated with the mobile device 150 may be accessed by the TSM computer 110. For example, stored identifying information (e.g., previously received identifying information, updated identifying information, etc.) may be accessed. In certain embodiments, a device identifier included in the received request or communication may be utilized to access a database that includes stored device identification information and/or key information. As desired, stored information that may be utilized to independently generate a comparison key may be accessed. For example, the information that was previously utilized to derive the rotated key provided to the mobile device 150 may be accessed, and a comparison key may be independently generated. As an alternative to independently generating a comparison key, a stored rotated key may be accessed for comparison.

At block 435, a determination may be made as to whether a correspondence exists between a comparison key and a rotated key utilized by the mobile device 150. For example, a determination may be made as to whether the independently stored and/or derived comparison key utilized by the TSM computer 110 facilitates the decryption of the received request or communication. In this regard, authentication of the mobile device 150 may be facilitated. In certain embodiments, received identifying information may also be compared to stored identifying information in order to determine whether a correspondence exists. The comparison of identifying information may facilitate the identification of fraudulent requests. For example, if the identifying information was previously updated by the TSM computer 110, then a request that utilizes the original identifying information may be a suspicious request.

If it is determined at block 435 that a key correspondence exists and/or that an identifying information correspondence exists, then operations may continue at block 440, and the mobile device 150 may be authenticated. As desired, the request received from the mobile device 150 may be processed by the TSM computer 110. For example, a provisioning request may be processed, and requested provisioning data may be provided to the mobile device 150. If, however, it is determined at block 435 that no key correspondence exists and/or that an identifying information correspondence does not exist, then operations may continue at block 445, and the mobile device 150 may not be authenticated. As desired, any number of suitable alerts may be generated to indicate the failure to authenticate the mobile device. Additionally, alert messages and/or error messages may be communicated to the mobile device 150 and/or any number of other entities.

Although the subsequent authentication of the mobile device 150 is described as being performed by the TSM computer 110, in certain embodiments, the subsequent authentication may be performed by other systems and/or devices, such as one of the service provider computers 160a, 160b illustrated in FIG. 1. For example, a mobile device 150 may contact a service provider computer 160 to request the provisioning of a payment account (e.g., a credit account, a debit account, a stored value account, etc.), application, or other data. The service provider computer 160 may have previously received identifying information for the device and/or information that may be utilized to independently generate a comparison key. The service provider computer 160 may utilize at least a portion of the previously received information to determine whether the mobile device 150 is authenticated. Based upon the authentication determination, the service provider computer 160 may either generate an exception or direct the TSM computer 110 to provision the mobile device with the requested account, application, or data.

The method 400 may end following either block 440 or block 445.

Figure 7:
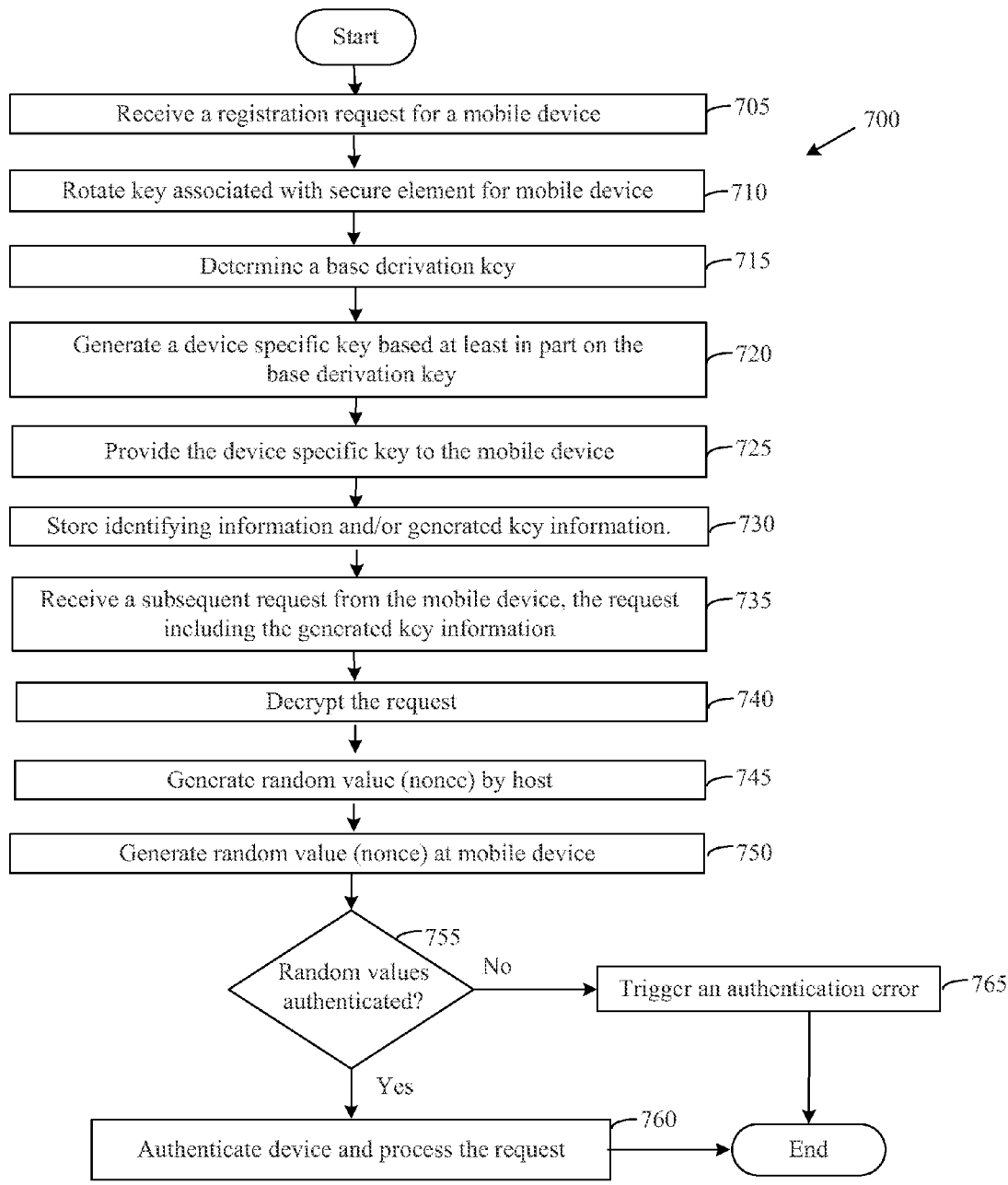

In other embodiments, a base derivation key and/or a device specific key may be generated for a mobile device. As desired, identifying information for the mobile device and/or a secure element may also be updated and provided to the mobile device and/or utilized to derive the base derivation key, and/or the device specific key. The base derivation key and/or device specific key and/or the updated information may then be provided to the mobile device and utilized to facilitate subsequent authentication of the mobile device. FIG. 7 described below illustrates a flow diagram of an example method for authenticating a mobile device, according to an example embodiment of the invention.

Figure 5:
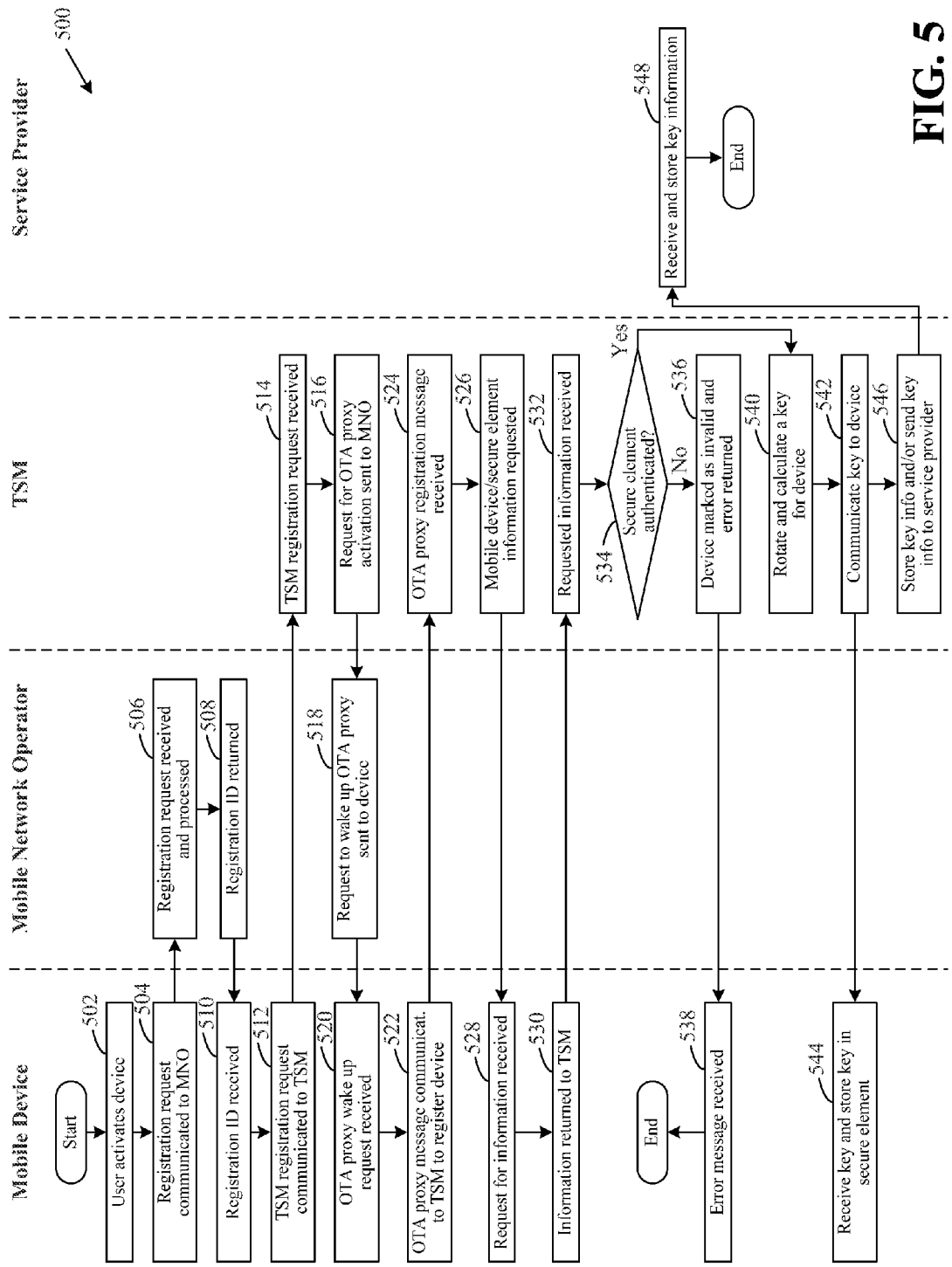
FIG. 5 illustrates a flow diagram of an example process for providing a rotated key to a mobile device, according to an example embodiment of the invention.

FIG. 5 illustrates a flow diagram of an example method 500 for providing a rotated key to a mobile device, according to an example embodiment of the invention. The method 500 may be one example of the operations that may be performed at blocks 405-420 illustrated in the method 400 of FIG. 4. As such, the method 500 may be performed by a suitable trusted service management system, such as the system 100 illustrated in FIG. 1. The method 500 may begin at block 502.

At block 502 a user may activate a mobile device, such as one of the mobile devices 150 illustrated in FIG. 1. In certain embodiments, the activation of the mobile device 150 may be an initial activation of the mobile device 150. In other embodiments, the activation of the mobile device 150 may be an activation following a software update to the mobile device 150 by an MNO, such as the MNO computer 140 illustrated in FIG. 1. Based upon an activation of the mobile device 150, the mobile device 150 may attempt to facilitate a registration with the MNO computer 140 and/or a TSM computer, such as the TSM computer 110 illustrated in FIG. 1. In one example embodiment, an OTA proxy may be installed on the mobile device 150 at manufacture. Additionally, a mobile wallet may be installed on the mobile device 150. Upon an initial activation of the mobile device 150, the mobile wallet and the OTA proxy may be activated in an attempt to register the mobile device 150.

In certain embodiments, once the mobile device 150 has been activated and/or once a user has logged into the mobile device 150, a suitable authentication notification may be sent to the MNO computer 140. The MNO computer 140 may validate the mobile device 150, and an authentication token may be returned to the mobile device 150. The authentication token may be utilized to form a relatively secure communications channel between the mobile device 150 and the MNO computer 140.

At block 504, a registration request may be generated by the mobile device 150, and the generated registration request may be output for communication to the MNO computer 140. The registration request may be received and processed by the MNO computer 140 at block 506. In response to the registration request, a registration identifier may be output by the MNO computer 140 at block 508 for communication to the mobile device 150. As desired, an instruction for the mobile device 150 to contact the TSM computer 110 for registration purposes utilizing the registration identifier may also be communicated to the mobile device 150. In certain embodiments, contact information for the TSM computer 110 may also be communicated to the mobile device 150.

The registration identifier and/or associated information may be received by the mobile device 150 at block 510. At block 512, a TSM registration request may be generated by the mobile device 150 and output for communication to the TSM computer 110. In certain embodiments, the registration identifier may be utilized to generate the TSM registration request and/or direct the transmission of the TSM registration request to the TSM computer 110. The TSM registration request may be received and processed by the TSM computer 110 at block 514. As desired in various embodiments, any number of suitable networks and/or communications techniques may be utilized to facilitate the communication of the request to the TSM computer 110. For example, the request may be communicated via a suitable carrier network, such as one of the carrier networks 180 illustrated in FIG. 1. In certain embodiments, the request may be communicated directly to the TSM computer 110. In other embodiments, the request may be communicated through any number of intermediary systems and/or devices, such as an MNO computer 140. During the processing of the TSM registration request, the TSM computer 110 may request an OTA proxy associated with the mobile device 150 be woken up or activated. For example, a request for OTA proxy activation may be sent to the MNO computer 140 at block 516. In certain embodiments, the MNO computer 140 may be requested to wake up an OTA proxy that is stored on a general or shared memory or general operation chip associated with the mobile device 150. The MNO computer 140 may receive the request at block 518 and push or otherwise communicate a request to wake up the OTA proxy to the mobile device 150.

At block 520, the OTA proxy wake up request may be received by the mobile device 150. The OTA proxy associated with the mobile device 150 may be activated and/or woken up, and an OTA proxy message associated with the registration of the mobile device 150 may be communicated by the mobile device 150 to the TSM computer 110 at block 522. The OTA proxy registration message may be received by the TSM computer 110 at block 524. In certain embodiments, a secure communications channel may be established between the TSM computer 110 and the mobile device 150 (or the mobile device secure element). As desired, a wide variety of suitable techniques may be utilized to authenticate a secure communications channel. For example, a registration identifier received from the mobile device 150 and a registration identifier received from the MNO computer 140 may be compared to facilitate the authentication of a secure communications channel. As another example, one or more Application Protocol Data Unit ("APDU") commands may be utilized to facilitate the authentication of a secure communications channel. As yet another example, any number of suitable handshake procedures may be utilized to facilitate the authentication and/or the establishment of a secure communications channel.

At block 526, identifying information for the mobile device 150 and/or a mobile device secure element may be requested by the TSM computer 110. For example, the mobile device 150 may be requested to communicate identifying information to the TSM computer 110 via the secure communications channel. A wide variety of different types of identifying information may be requested as desired in various embodiments of the invention, including but not limited to, an identifier of the secure element and/or CPLC information for the secure element.

At block 528, the request for identifying information may be received by the mobile device 150 via the secure communications channel, and the requested information may be returned to the TSM computer 110 by the mobile device 150 at block 530. At block 532, the TSM computer 110 may receive and process the requested identifying information. In certain embodiments of the invention, the TSM computer 110 may determine at block 534 whether the secure element may be authenticated. For example, at least a portion of the received identifying information may be compared to expected identifying information, and a determination may be made as to whether the secure element and/or the mobile device 150 is valid based at least in part upon the comparison. In one example embodiment, received CPLC information may be compared to stored CPLC information, such as CPLC information previously received from a device manufacturer or other third party data source. If it is determined at block 534 that the secure element is not authenticated, then operations may continue at block 536, and the mobile device 150 may be marked as an invalid mobile device, and the registration process may end. As desired, a registration error message may be communicated by the TSM computer 110 to the mobile device 150 for display or other presentation to a user. The error message may be received and processed by the mobile device 150 at block 538, and operations may end following block 538.

If, however, it is determined at block 534, that the secure element is authenticated and/or that the mobile device 150 is valid, then operations may continue at block 540. At block 540, a rotated key may be generated or derived for the mobile device 150 and/or the secure element. A wide variety of suitable methods and/or techniques may be utilized as desired to generate or derive a rotated key. For example, in certain embodiments, a base level key, such as a master key determined by a mobile device manufacturer, may be utilized to generate or derive the rotated key. Additionally, a wide variety of suitable rotation techniques (e.g., a key schedule, etc.) and/or other methods or derivation techniques may be utilized as desired to derive a rotated key. For example, additional information may be combined with the base level key during a derivation of a rotated key. In certain embodiments, at least a portion of the received identifying information, such as CPLC information and/or an identifier of the secure element, may be utilized in conjunction with the base level key to derive a rotated key. For example, an identifier of the secure element may be combined (e.g., added, multiplied, etc.) with the base level key to derive a rotated key for the mobile device 150.

Additionally, in certain embodiments of the invention, identifying information for the mobile device 150 may be modified or updated by the TSM computer 110 at block 540. For example, received CPLC information may be modified or updated by the TSM computer 110. A wide variety of different aspects of CPLC information and/or identifying information may be updated as desired in various embodiments, such as date information, version information, key version information, etc. In certain embodiments, the updated identifying information may be utilized in the derivation of a rotated key.

At block 542, the generated or derived rotated key and/or any updated identifying information may be communicated or transmitted by the TSM computer 110 to the mobile device 150. For example, the rotated key and/or identifying information may be provisioned or otherwise provided to a secure element of the mobile device 150. The mobile device 150 may receive and store the rotated key and/or identifying information at block 544. For example, the rotated key and/or identifying information may be stored on the secure element. In this regard, the rotated key may be utilized by the mobile device 150 and/or the secure element to encrypt subsequent communications, such as provisioning requests, transmitted to the TSM computer 110.

At block 546, the rotated key, information utilized to derive the rotated key, received identifying information, and/or updated identifying information may be stored by the TSM computer 110 in one or more suitable memory devices, such as the databases 138 illustrated in FIG. 1. In this regard, the stored information may be subsequently accessed to facilitate authentication of the mobile device 150 by the TSM computer 110. Additionally or alternatively, in certain embodiments, at least a portion of the information (e.g., rotated key, information utilized to derive the rotated key, received identifying information, and/or updated identifying information) may be communicated by the TSM computer 110 to one or more service providers 160*a*, 160*b*, such as a service provider that controls the provisioning of payment accounts to the mobile device 150. In this regard, a service provider 160 may facilitate subsequent authentication of the mobile device 150. The communicated information may be received and stored by one or more service providers 160*a*, 160*b* at block 548.

The method 500 may end following either block 538 or block 548.

Figure 6:
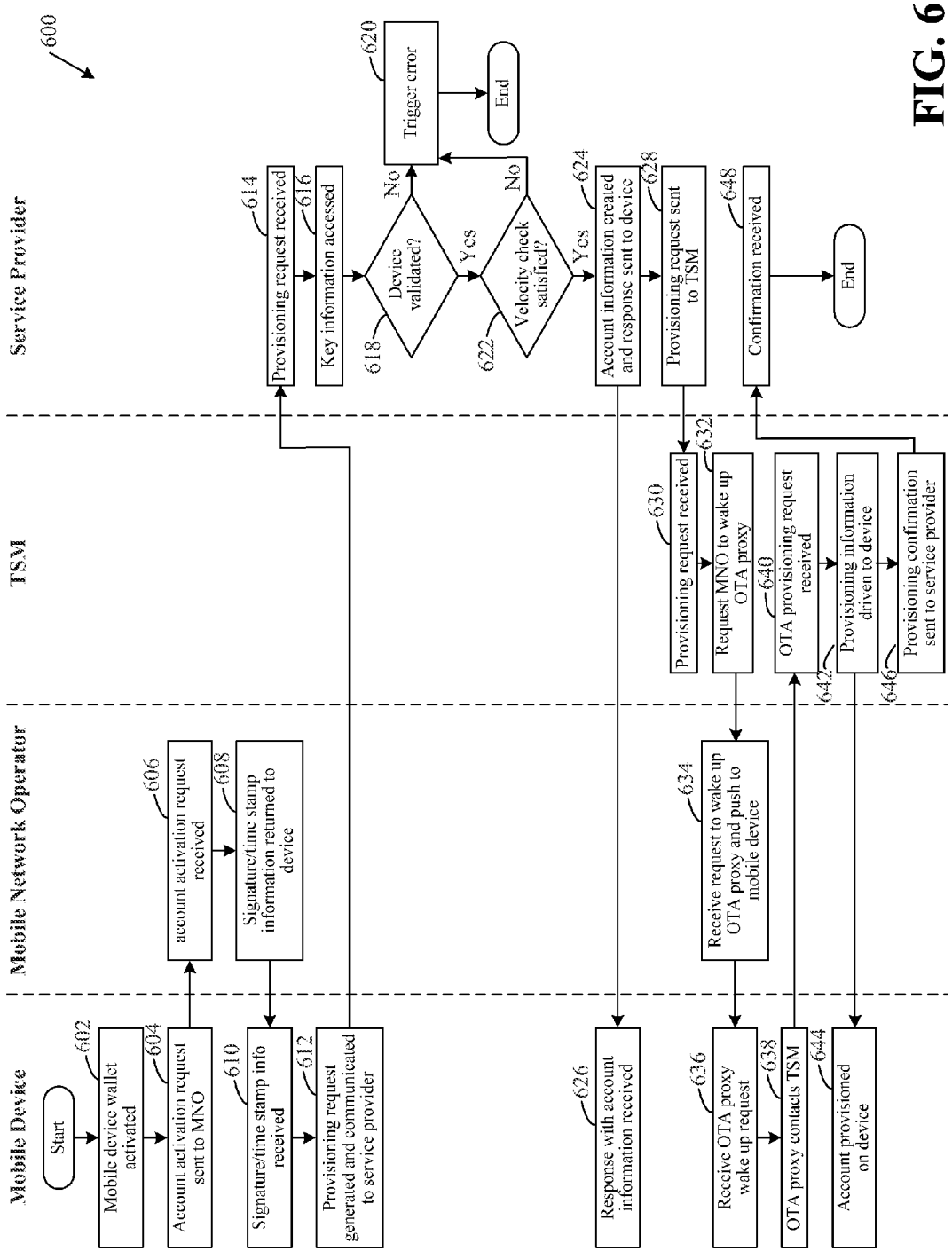
FIG. 6 illustrates a flow diagram of an example process for authenticating a mobile device utilizing a rotated key, according to an example embodiment of the invention.

FIG. 6 illustrates a flow diagram of an example method 600 for authenticating a mobile device utilizing a rotated key, according to an example embodiment of the invention. The method 600 may be one example of the operations that may be performed at blocks 425-440 illustrated in the method 400 of FIG. 4. As such, the method 600 may be performed by a suitable trusted service management system, such as the system 100 illustrated in FIG. 1. The method 600 illustrated in FIG. 6 is one example of the operations that may be performed to authenticate a mobile device during the provisioning of a payment account to the mobile device. It will be appreciated that similar operations may be performed in conjunction with other provisioning requests and/or other requests made by the mobile device. The method 600 may begin at block 602.

At block 602, a mobile device wallet associated with a mobile device, such as one of the mobile devices 150a, 150b illustrated in FIG. 1, may be activated. In certain embodiments, the mobile device wallet may facilitate the management of payment accounts (e.g., prepaid accounts, credit accounts, debit accounts, stored value accounts, etc.) and/or the use of payment accounts to facilitate transactions (e.g., purchase transactions, payment transactions, etc.). At block 604, an account activation request, such as a request to provision a new payment account to the mobile device 150, may be generated by the mobile device 150 and/or the mobile device wallet. For example, the account activation request may be generated based upon the receipt of a user command or user request by the mobile device 150. The generated account activation request may then be transmitted or otherwise communicated to a suitable MNO computer associated with the mobile device 150, such as one of the MNO computers 140a, 140b illustrated in FIG. 1.

At block 606, the account activation request may be received and processed by the MNO computer 140. As desired in certain embodiments, prior to the account activation request being communicated to the MNO computer 140, the mobile device 150 may be authenticated by the MNO computer 140, and an authentication token may be returned to the mobile device 150 in a similar manner as that described above with reference to FIG. 5. At block 608, which may be optional in certain embodiments of the invention, signature and/or time stamp information may be added to the account activation request by the MNO computer 140. In certain embodiments, an authentication token may be verified prior to adding the signature and/or time stamp information to the account activation request. The signature and/or time stamp information may be returned to the mobile device 150 by the MNO computer 140, and the mobile device 150 may receive the signature and/or time stamp information at block 610.

At block 612, a provisioning request for a payment account may be generated by the mobile device 150. According to an aspect of the invention, a rotated key previously provided to the mobile device 150 may be utilized to facilitate the generation and/or processing of the provisioning request. For example, the rotated key may be utilized to encrypt a generated provisioning request. Additionally, in certain embodiments, a wide variety of identifying information, such as CPLC information, may be included in and/or appended to the generated provisioning request. Once generated, the provisioning request may be output by the mobile device 150 for communication to a suitable account service provider computer, such as one of the service provider computers 160a, 160b illustrated in FIG. 1. The service provider computer 160 may attempt to authenticate the mobile device 150 and direct provisioning of the requested payment account based at least in part upon the results of the attempted authentication. Although the authentication processing is described below as being performed by a service provider computer 160, it will be appreciated that the authentication processing may be performed by one or more other components of the system 100, such as the TSM computer 110.

At block 614, the provisioning request may be received by the service provider computer 160. At block 616, the mobile device 150 may be identified, and the stored key information associated with the mobile device 150 may be accessed. For example, an identifier of the mobile device 150 (e.g., a telephone number, a device identifier, an identifier of the secure element, etc.) that is included in the provisioning request or associated with the provisioning request may be utilized to access a database of stored key information. In this regard, previously stored key information, such as a previously stored rotated key and/or previously stored information that may be utilized to derive the rotated key (e.g., a base level key, identifying information for the device and/or secure element, etc.), may be accessed by the service provider computer 160. Additionally, in certain embodiments, previously stored identifying information, such as previously stored CPLC information, may be accessed by the service provider computer 160. In one example embodiment, the accessed identifying information may be previously updated or modified identifying information (e.g., updated CPLC information, etc.) that was provided to the mobile device 150 and/or the secure element during a previous registration process, such as the process described above with reference to FIG. 5.

At block 618, a determination may be made as to whether the mobile device 150 is validated and/or authenticated. A wide variety of various tests may be performed as desired in order to determine whether the mobile device 150 is validated and/or authenticated. For example, a determination may be made as to whether a stored rotated key and/or an independently derived rotated key is capable of decrypting a portion or all of the provisioning request. As another example, a determination may be made as to whether identifying information associated with the request (e.g., CPLC information) matches or corresponds to stored CPLC information. In certain embodiments, the updating of the CPLC information during registration (e.g., an update of date and/or version information) may form an audit trail that may be validated during the processing of a provisioning request. As a result of the determination made at block 618, potentially suspicious provisioning requests may be identified. If it is determined at block 618 that the mobile device 150 is not validated and/or authenticated, then operations may continue at block 620, and the mobile device 150 may be identified as an invalid device. As desired, any number of errors and/or exceptions (e.g., alert messages, exception messages, etc.) may be generated. For example, an error message may be returned to the mobile device 150 and/or an error message (e.g., a potential security threat message, etc.) may be generated, transmitted, and/or stored for use by service provider personnel. Operations of the method 600 may end following block 620.

If, however, it is determined at block 618 that the mobile device 150 is validated and/or authenticated, then operations may continue at block 622. At block 622, which may be optional in certain embodiments of the invention, a determination may be made as to whether a velocity check is satisfied. The velocity check may evaluate a wide variety of timing information and/or information associated with a number of occurrences associated with provisioning requests. For example, a velocity check may determine whether time stamp information added by the MNO computer 140 and included in the provisioning request and/or CPLC timing information satisfies timing parameters (e.g., timing threshold parameters, etc.) of the service provider computer 160. As one example, a determination may be made as to whether the provisioning request is received within a certain period of time following time stamping by the MNO computer 140. The velocity check described above is provided by way of example only and a wide variety of other velocity checks may be performed as desired. If it is determined at block 622 that the velocity check is not satisfied, then operations may continue at block 620 described above, and an error may be triggered or generated, and operations may end. If, however, it is determined at block 622 that the velocity check is satisfied, then operations may continue at block 624.

At block 624, account information may be created and/or generated for the requested account. For example, a new account number, initial amount, security information, and/or other information associated with a new stored value account may be created. As another example, account information associated with an existing account to be provisioned may be accessed. As desired in certain embodiments, a message indicating that account information has been created may be generated and returned to the mobile device 150. A wide variety of information may be included in the generated message as desired, such as the last four digits of an account number, financial institution or bank information (e.g., a bank name, etc.), and/or information associated with an account balance or credit limit. The mobile device 150 may receive the message at block 626 and, as desired, output an indication to a user that the account is being provisioned. Additionally, in certain embodiments, information included in the message may subsequently be utilized to validate the provisioned account.

At block 628, the service provider computer 160 may generate a provisioning request for the account, and the provisioning request may be communicated to the TSM computer 110. The TSM computer 110 may receive the provisioning request at block 630. At block 632, the TSM computer 110 may request an OTA proxy associated with the mobile device 150 be woken up or activated. For example, a request for OTA proxy activation may be sent to the MNO computer 140 at block 632. In certain embodiments, the MNO computer 140 may be requested to wake up an OTA proxy that is stored on a general or shared memory or general operation chip associated with the mobile device 150. The MNO computer 140 may receive the request at block 634 and push or otherwise communicate a request to wake up the OTA proxy to the mobile device 150.

At block 636, the OTA proxy wake up request may be received by the mobile device 150. The OTA proxy associated with the mobile device 150 may be activated and/or woken up, and an OTA proxy message associated with the provisioning of the mobile device 150 may be communicated by the mobile device 150 to the TSM computer 110 at block 638. The OTA proxy provisioning message may be received by the TSM computer 110 at block 640. In certain embodiments, a secure communications channel may be established between the TSM computer 110 and the mobile device 150 (or the mobile device secure element). At block 642, provisioning information for the payment account may be driven to the mobile device 150. In other words, the payment account may be provisioned, activated, and/or personalized on the mobile device 150. At block 644, the provisioning information may be received by the mobile device 150, and the account may be provisioned. In certain embodiments, the payment account may be provisioned onto a secure element of the mobile device 150. The payment account may then be accessed and utilized by a wallet application executed by the mobile device 150. In this regard, the payment account may be utilized to complete transactions.

At block 646, the TSM computer 110 may generate a provisioning confirmation message. The generated provisioning confirmation message may confirm that the payment account has been successfully provisioned onto the mobile device 150. The provisioning confirmation message may be communicated by the TSM computer 110 to the service provider computer 160, and the service provider computer 160 may receive the message at block 648. In this regard, the service provider computer 160 may verify that the payment account has been successfully provisioned to the mobile device 150, and the service provider computer 160 may activate the payment account. Operations of the method 600 may then end following block 648.

The method 600 may end following either block 620 or block 648.

FIG. 7 illustrates a flow diagram of an example method 700 for authenticating a mobile device, according to an example embodiment of the invention. The method 700 may be performed by a suitable trusted service management system, such as the system 100 illustrated in FIG. 1. The method 700 may begin at block 705.

At block 705, a registration request may be received for a mobile device, such as one of the mobile devices 150 illustrated in FIG. 1. For example, a registration request may be received based upon an initial activation of the mobile device 150. During the initial activation (or following an update of the mobile device 150), the mobile device 150 may attempt to register the mobile device and/or the secure element with a TSM computer 110 or TSM system. As another example, a user of a mobile device 150 may request the provisioning of an application, account, or other data, and a registration request may be communicated from the mobile device 150 to the TSM computer 110 in association with the provisioning request. Alternatively, a registration process may be initiated based upon the processing of a provisioning request. For example, during the processing of a provisioning request, a determination may be made that the mobile device 150 has not previously been registered with the TSM computer 110, and a registration process may be initiated.

According to an aspect of the invention, identifying information or identification information for the mobile device 150 and/or a secure element associated with the mobile device may be received in conjunction with a registration request and/or during a communications session (e.g., a secure communications session) established in association with a registration request. A wide variety of identifying information may be received as desired in various embodiments of the invention, such as card production life cycle ("CPLC") information and/or identifying information associated with a secure element (e.g., the ICCID, IMSI, etc.). CPLC information may include variable length data associated with any integrated circuit ("IC") incorporated into the mobile device 150, such as a secure element chip and/or a subscriber identity module ("SIM") card. A wide variety of information may be included in CPLC data, including but not limited to, an identifier of an IC fabricator, an IC type, an operating system identifier, an operating system release date, an operating system release level, an IC fabrication date, an IC serial number, an IC batch identifier, an IC module fabricator, an IC module packaging date, an IC manufacturer, an IC embedding date, an IC pre-personalizer identification, an IC pre-personalizer equipment date, an IC pre-personalizer equipment identifier, an IC personalizer identifier, an IC personalization date, and/or an IC personalization equipment identifier. In certain embodiments, CPLC data may be provided by a chip and/or a mobile device as a tag or data string.

At block 710, a rotated key may be generated, determined, or derived for a secure element for the mobile device. In certain embodiments, a key associated with a secure element chip and/or a subscriber identity module ("SIM") card for the mobile device 150, such as a KMC key, can be derived from another key, such as a CMK key. Rotation of the key can authenticate some or all of the information or identification information for the mobile device 150 and/or a secure element associated with the mobile device. For example, CPLC information on a secure element associated with the mobile device 150 can be authenticated when the key is rotated. In any instance, the generated or derived rotated key and/or any updated identifying information may be provided by the TSM computer 110 to the mobile device 150. For example, the rotated key and/or identifying information may be provisioned or otherwise provided to a secure element of the mobile device 150. In this regard, the rotated key may be utilized by the mobile device 150 to encrypt subsequent communications, such as provisioning requests, transmitted to the TSM computer 110.

Additionally, at block 710, the TSM computer 110 may store or direct the storage of the generated rotated key and/or identifying information in one or more suitable memory devices, such as the databases 138 illustrated in FIG. 1. In this regard, the TSM computer 110 may access the information to facilitate an authentication of the mobile device 150 at a subsequent point in time, such as during the processing of a provisioning request.

Additionally, a wide variety of suitable rotation techniques (e.g., a key schedule, etc.) and/or other methods or derivation techniques may be utilized as desired to derive a rotated key. For example, additional information may be combined with a base level key during a derivation of a rotated key. In certain embodiments, at least a portion of the received identifying information, such as CPLC information and/or an identifier of the secure element, may be utilized in conjunction with the base level key to derive a rotated key. For example, an identifier of the secure element may be combined (e.g., added, multiplied, etc.) with the base level key to derive a rotated key for the mobile device 150.

As a result of the key rotation process, the mobile device 150 and/or the secure element may be validated by the TSM computer 110. For example, a determination may be made as to whether the mobile device 150 is a valid device that has been produced by a suitable device manufacturer and/or associated with a suitable MNO 140. In certain embodiments, identifying information received from the mobile device 150 may be compared to expected identifying information in order to facilitate a validation of the mobile device 150. For example, received CPLC data may be compared to stored CPLC data that was previously received from another entity, such as a device manufacturer. Based at least in part upon the comparison, a determination may be made as to whether the mobile device 150 is a valid device. If it is determined that the mobile device 150 is not a valid device, then the registration process may end, and any number of suitable errors and/or exceptions may be triggered. Otherwise, the registration process may continue.

Additionally, in certain embodiments of the invention, identifying information for the mobile device 150 may be modified or updated by the TSM computer 110. For example, received CPLC information may be modified or updated by the TSM computer 110. A wide variety of different aspects of CPLC information and/or identifying information may be updated as desired in various embodiments, such as date information, version information, key version information, etc. In certain embodiments, the updated identifying information may be utilized in the derivation of a rotated key.

At block 715, a base derivation key may be generated, determined, or derived for the mobile device 150 and/or the secure element. In certain embodiments, a base derivation key can be determined based at least in part on a particular MNO and BIN account number, or other information. For example, a particular MNO, such as a MNO associated with at least one MNO computer 140*a*, 140*b*, may desire to select or otherwise determine the base derivation key. In certain embodiments, a base derivation key can be a DUKPT key.

At block 720, a device specific key may be generated, determined, or derived for the mobile device 150 and/or the secure element. In certain embodiments, a base derivation key, such as a master key determined by a MNO, may be utilized to generate or derive a device specific key. For example, a device specific key, such as a terminal key, can be determined based at least in part on a base derivation key, such as a DUKPT key. Additionally, a wide variety of suitable rotation techniques (e.g., a key schedule, etc.) and/or other methods or derivation techniques may be utilized as desired to derive a device specific key. For example, additional information may be combined with the base derivation key during a derivation of a device specific key. In certain embodiments, at least a portion of the received identifying information, such as CPLC information and/or an identifier of the secure element, may be utilized in conjunction with the base derivation key to derive a device specific key. For example, an identifier of the secure element may be combined (e.g., added, multiplied, etc.) with the base derivation key to derive a device specific key for the mobile device 150.

At block 725, the generated or derived device specific key and/or any updated identifying information may be provided by the TSM computer 110 to the mobile device 150. For example, the device specific key and/or identifying information may be provisioned or otherwise provided to a secure element of the mobile device 150. In this regard, the device specific key may be utilized by the mobile device 150 to encrypt subsequent communications, such as provisioning requests, transmitted to the TSM computer 110. In certain embodiments, the generated or derived device specific key and/or any updated identifying information can be transmitted by the TSM computer 110 to the mobile device 150 via an encrypted communication, such as a key encryption key. Additionally, in block 725, CPLC information stored on the secure element of the mobile device 150 can be modified to include certain information, such as a DUKPT OID (object identifier), DUKPT master key OID, key name, key set number, key set ID (e.g., channel or MNO, etc.), key index, device ID (e.g., TRSM ID), expiration data, etc. In certain embodiments, CPLC information can be modified to include identification information associated with an entity or location for use in directing the modified CPLC information to the identified entity or location in order to be verified or authenticated, such as an entity that possesses a base derivation key.

At block 730, the TSM computer 110 may store or direct the storage of the generated device specific key and/or identifying information in one or more suitable memory devices, such as the databases 138 illustrated in FIG. 1. Additionally, the TSM computer 110 can store modified CPLC information as described in block 725. In this regard, the TSM computer 110 may access the information to facilitate an authentication of the mobile device 150 at a subsequent point in time, such as during the processing of a provisioning request.

At block 735, a subsequent request or other communication may be received from the mobile device 150. For example, a request for the TSM computer 110 to provision an application or a payment account may be received. In accordance with an aspect of the invention, the request or communication may be encrypted with the device specific key previously provided to the mobile device 150. For example, some or all subsequent requests or communications from the mobile device 150 can be encrypted using the device specific key. Additionally, in certain embodiments, the request or communication may include identifying information for the mobile device 150, such as a portion of updated identifying information previously provided to the mobile device 150, which may also be encrypted using the device specific key.

At block 740, the request or other communication is received by the TSM computer 110, and the TSM computer decrypts the request or other communication using stored information associated with the mobile device 150, which is accessible by the TSM computer 110. For example, stored identifying information (e.g., previously received identifying information, updated identifying information, etc.) may be accessed by the TSM computer 110 either within the request or stored by the mobile device 150 or TSM computer 110. In certain embodiments, a device identifier included in the received request or communication may be utilized to access a database that includes stored device identification information and/or key information. As desired, stored information, such as a device specific key for the mobile device, may be accessed and used to decrypt the request or other communication.

At block 745, after the request is decrypted, a random number can be generated. In certain embodiments, the TSM computer 110 can generate a random number, such as a nonce, and the random number can be transmitted to the mobile device 150.

At block 750, the random number can be received by the mobile device, and the mobile device also generates a random number. In certain embodiments, the mobile device 150 can append its own generated random number, such as a nonce, to the random number generated by the TSM computer 110. The mobile device 150 can then send the combined random numbers to the TSM computer 110 to be verified or authenticated.

At block 755, a determination may be made as to whether the random values are verified or authenticated. For example, a determination may be made as to whether the independently stored and/or derived comparison key utilized by the TSM computer 110 facilitates the decryption of the received request or communication. In this regard, authentication of the mobile device 150 may be facilitated. In certain embodiments, received identifying information may also be compared to stored identifying information in order to determine whether a correspondence exists. The comparison of identifying information may facilitate the identification of fraudulent requests. For example, if the identifying information was previously updated by the TSM computer 110, then a request that utilizes the original identifying information may be a suspicious request.

If it is determined at block 755 that the random numbers are verified or authenticated, then operations may continue at block 760, and the mobile device 150 may be authenticated. As desired, the request received from the mobile device 150 may be processed by the TSM computer 110. For example, a provisioning request may be processed, and requested provisioning data may be provided to the mobile device 150. If, however, it is determined at block 765 that the random numbers are not verified or authenticated, then operations may continue at block 765, and the mobile device 150 may not be authenticated. As desired, any number of suitable alerts may be generated to indicate the failure to authenticate the mobile device. Additionally, alert messages and/or error messages may be communicated to the mobile device 150 and/or any number of other entities.

Although the subsequent authentication of the mobile device 150 is described as being performed by the TSM computer 110, in certain embodiments, the subsequent authentication may be performed by other systems and/or devices, such as one of the service provider computers 160a, 160b illustrated in FIG. 1. For example, a mobile device 150 may contact a service provider computer 160 to request the provisioning of a payment account (e.g., a credit account, a debit account, a stored value account, etc.), application, or other data. The service provider computer 160 may have previously received identifying information for the device and/or information that may be utilized to independently generate a comparison key. The service provider computer 160 may utilize at least a portion of the previously received information to determine whether the mobile device 150 is authenticated. Based upon the authentication determination, the service provider computer 160 may either generate an exception or direct the TSM computer 110 to provision the mobile device with the requested account, application, or data.

The method 700 may end following either block 760 or block 765.

The operations described and shown in the methods 300, 400, 500, 600, and 700 of FIGS. 3-7 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 3-7 may be performed.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A computer-implemented method for authenticating mobile devices, the method comprising:
   receiving, by a service manager computer comprising one or more processors, from a mobile device, a registration request and identifying information for the mobile device, the identifying information comprising information for a secure element associated with the mobile device, wherein the service manager computer is in communication with a plurality of network operators and a plurality of service provider computers;
   determining, by the service manager computer based upon the received identifying information and a base level key, a rotated key for the mobile device;
   providing, by the service manager computer, the determined rotated key to the mobile device;
   receiving, by the service manager computer, from the mobile device after providing the rotated key to the mobile device, a subsequent provisioning request to provision an application to the mobile device, wherein the subsequent provisioning request is encrypted with the rotated key, and the application is provided by a service provider;
   authenticating, by the service manager computer in response to the subsequent provisioning request, the mobile device based at least in part on the rotated key; and
   provisioning, by the service manager computer upon authentication of the mobile device, the application to the mobile device.

2. The computer-implemented method of claim 1, further comprising:
   establishing, prior to determining the rotated key, a secure communications channel with the secure element; and
   authenticating, via the secure communications channel, the secure element.

3. The computer-implemented method of claim 1, wherein receiving identifying information comprises receiving card production life cycle (CPLC) information.

4. The computer-implemented method of claim 1, further comprising:
   updating the identifying information; and
   associating the rotated key with the updated identifying information.

5. The computer-implemented method of claim 4, wherein updating the identifying information comprises updating a card production life cycle (CPLC) for the mobile device or the secure element.

6. The computer-implemented method of claim 4, further comprising:
   communicating the updated identifying information and information associated with the rotated key to the service provider for subsequent authentication of the mobile device.

7. The computer-implemented method of claim 6, further comprising:
   receiving, from the service provider, a request to provision the mobile device; and
   provisioning the mobile device in response to the received request,
   wherein the request is received following the authentication of the mobile device by the service provider based at least in part upon the rotated key.

8. The computer-implemented method of claim 7, wherein the service provider authenticates the mobile device by reconstructing the rotated key utilizing the updated identifying information.

9. The computer-implemented method of claim 7, wherein provisioning the mobile device comprises provisioning the secure element of the mobile device with a financial account.

10. A system, comprising:
    at least one memory operable to store computer-executable instructions; and
    at least one processor configured to access the at least one memory and execute the computer-executable instructions to:
      receive communication from a plurality of network operators and a plurality of service provider computers;
      receive, from a mobile device, a registration request and identifying information for the mobile device, the identifying information comprising information for a secure element associated with the mobile device;
      determine, based upon the received identifying information and a base level key, a rotated key for the device;
      provide the determined rotated key to the mobile device;
      receive, from the mobile device after providing the rotated key to the mobile device, a subsequent provisioning request to provision an application to the mobile device, wherein the subsequent provisioning request is encrypted with the rotated key, and the application is provided by a service provider;
      authenticate, in response to the subsequent provisioning request, the mobile device based at least in part on the rotated key; and
      provision, upon authentication of the mobile device, the application to the mobile device.

11. The system of claim 10, wherein the at least one processor is further configured to execute the computer-executable instructions to:
  establish, prior to determining the rotated key, a secure communications channel with the secure element; and
  authenticate, via the secure communications channel, the secure element.

12. The system of claim 10, wherein the received identifying information comprises card production life cycle (CPLC) information.

13. The system of claim 10, wherein the at least one processor is further configured to execute the computer-executable instructions to:
  update the identifying information; and
  associate the rotated key with the updated identifying information.

14. The system of claim 13, wherein the updated identifying information comprises an updated card production life cycle (CPLC) for the mobile device or the secure element.

15. The system of claim 13, wherein the at least one processor is further configured to execute the computer-executable instructions to:
  direct communication of the updated identifying information and information associated with the rotated key to the service provider for subsequent authentication of the mobile device.

16. The system of claim 15, wherein the at least one processor is further configured to execute the computer-executable instructions to:
  receive, from the service provider, a request to provision the mobile device; and
  direct provisioning of the mobile device in response to the received request,
  wherein the request is received following the authentication of the mobile device by the service provider based at least in part upon the rotated key.

17. The system of claim 16, wherein the service provider authenticates the mobile device by reconstructing the rotated key utilizing the updated identifying information.

18. The system of claim 16, wherein a financial account is provisioned to the secure element of the mobile device.

* * * * *